United States Patent
Dhayakar et al.

(12) 
(10) Patent No.: US 12,026,839 B1
(45) Date of Patent: Jul. 2, 2024

(54) DATA CENTER ASSET PRIVACY CONTROL FOR A REMOTE VIDEO PLATFORM

(71) Applicant: Equinix, Inc., Redwood City, CA (US)

(72) Inventors: Dhivya Dhayakar, Fremont, CA (US); Akshey Nama, Round Rock, TX (US)

(73) Assignee: Equinix, Inc., Redwood City, CA (US)

( * ) Notice: Subject to any disclaimer, the term of this patent is extended or adjusted under 35 U.S.C. 154(b) by 0 days.

(21) Appl. No.: 17/649,727

(22) Filed: Feb. 2, 2022

(51) Int. Cl.
 *G06T 19/00* (2011.01)
 *G06T 15/04* (2011.01)
 *G06V 10/70* (2022.01)

(52) U.S. Cl.
 CPC .......... *G06T 19/006* (2013.01); *G06T 15/04* (2013.01); *G06V 10/70* (2022.01); *G06T 2200/24* (2013.01)

(58) Field of Classification Search
 None
 See application file for complete search history.

(56) References Cited

U.S. PATENT DOCUMENTS

| | | | | |
|---|---|---|---|---|
| 6,774,932 | B1 * | 8/2004 | Ewing | H04N 5/262 348/157 |
| 10,623,680 | B1 | 4/2020 | Rangasamy et al. | |
| 11,272,256 | B2 * | 3/2022 | Pate | G06V 10/82 |
| 2009/0019553 | A1 * | 1/2009 | Narayanaswami | H04L 63/10 726/28 |
| 2018/0204362 | A1 * | 7/2018 | Tinsman | G06T 19/20 |
| 2020/0184839 | A1 * | 6/2020 | Dorenkamp | G09B 5/12 |
| 2021/0240909 | A1 * | 8/2021 | Ghiaus | G06F 16/9538 |
| 2021/0374406 | A1 * | 12/2021 | Brun | G06F 16/24569 |
| 2021/0397821 | A1 | 12/2021 | Martinez | |
| 2022/0084296 | A1 * | 3/2022 | Sadalgi | G06T 15/50 |
| 2022/0141082 | A1 * | 5/2022 | Brun | G06V 10/225 709/223 |
| 2022/0383594 | A1 * | 12/2022 | Li | G06T 7/11 |
| 2023/0038240 | A1 * | 2/2023 | Wiley | G06F 30/10 |

OTHER PUBLICATIONS

Dictionary, "Customer Definition & Meaning", 2022, retrieved from "https://www.dictionary.com/browse/customer" (Year: 2022).*
International Search Report and Written Opinion of International Application No. PCT/US2023/061524 dated Mar. 30, 2023, 13 pp.

\* cited by examiner

*Primary Examiner* — Michael J Cobb
(74) *Attorney, Agent, or Firm* — Shumaker & Sieffert, P.A.

(57) ABSTRACT

A method includes obtaining, by a remote video platform, location data for an extended reality privacy control for visually segmenting an environment within a remote asset facility into a customer space comprising customer assets for a customer and a non-customer space, receiving, by the remote video platform, first video data representing the environment within the remote asset facility, augmenting, by the remote video platform based on the location data for the extended reality privacy control, the first video data with the extended reality privacy control to generate second video data having at least a portion of the non-customer space occluded with the extended reality privacy control, and outputting, by the remote video platform, the second video data for display at a display device.

20 Claims, 7 Drawing Sheets

DATA CENTER ASSET PRIVACY CONTROL
FOR A REMOTE VIDEO PLATFORM

TECHNICAL FIELD

The disclosure relates to data centers, and more specifically, to remotely viewing customer assets within a multi-tenant co-location facility.

BACKGROUND

A facility such as a data center includes a data center storage space storing numerous electronic devices that produce heat, including network, server, and storage gear, as well as power distribution units for distributing power to devices within the facility. In some examples, a data center provider (hereinafter, "provider") may employ a communication facility, such as a data center or warehouse, in which multiple customers of the provider locate customer assets such as network, server, and storage gear that may then, in some cases, be interconnected to a variety of telecommunications and other network service provider(s), cloud service provider(s), enterprises, and other customers of the provider. Such a data center is often referred to as a co-location facility. The overall data center storage space may be shared by the multiple customers or "tenants" of the provider.

SUMMARY

In general, techniques are described for a remote video platform that provides, to a customer of a data center provider, a video feed representing a physical environment within a remote asset facility, where the video feed has been modified using augmented reality privacy controls to obscure spaces outside the boundary of a customer space for a customer having assets in the remote asset facility. The remote asset facility may be, for example, a co-location facility in which multiple customers may each co-locate their corresponding customer assets within a customer space allocated to that customer. The customer space may be bounded with physical barriers to demarcate the customer space from other spaces within the remote asset facility, such as provider spaces and spaces assigned to other customers of the remote asset facility.

One example of a privacy control may be an augmented reality privacy wall for augmenting video data taken from a remote asset facility. The remote video platform may augment the video data with a privacy wall to occlude, in the video data, spaces of the environment that are not a customer space. The augmented reality privacy wall may be overlayed onto images of the video data to cause the augmented video data to appear as if the privacy wall is an actual wall or plane that prevents visibility, by a viewer associated with a customer, into spaces of the environment that are not a customer space. In a data center that is a co-location facility, a boundary may be generated around a perimeter of the customer cage or cabinet to prevent the customer from viewing spaces outside of that customer cage or cabinet. In this manner, the customer may view any asset within their customer cage or cabinet (e.g., customer space) but is prevented from viewing assets beyond their own customer cage or cabinet.

Systems such as virtual reality systems, augmented reality systems, live video feeds, or the like, may be used by user associated with a customer to remotely view customer assets. The remote video platform described herein modifies video data to obscure images of assets that a customer is not authorized to view, e.g., assets of other customers co-located within the data center. In this way, the remote video platform allows the operator to view customer assets, while also providing customers with an extra security measure in that other customers are prevented from viewing the customer's assets within the customer space. As a result, the techniques may provide the technical advantage of privatized output video feeds, each tailored to a different customer of the remote asset facility provider, that facilitates customer asset privacy within the remote asset facility while still offering, for each customer, viewing of customer assets. This may improve the technical operation of the remote asset facility by increasing security and/or privacy of the many tenants/customers having equipment co-located therein and, at least in some cases, reducing a need for on-site operator visits.

In one example, a method includes obtaining, by a computing device, session data for a video feed comprising an extended reality privacy control for visually segmenting an environment within a remote asset facility into a customer space comprising customer assets for a customer and a non-customer space, wherein the session data comprises location data for the extended reality privacy control, receiving, by the computing device, first video data representing the environment within the remote asset facility, augmenting, by the computing device and based on the session data for the extended reality privacy control, the first video data with the extended reality privacy control to generate second video data having at least a portion of the non-customer space occluded with the extended reality privacy control, and outputting, by the computing device, the second video data for display at a display device.

In another example, a computing device for a video platform of a remote asset facility includes communication circuitry coupled to an input device and configured to provide a video feed of an environment, wherein the input device generates the video feed for a customer, processing circuitry, executing logic stored in memory, configured to obtain session data for an extended reality privacy control for visually segmenting the environment within the remote asset facility into a customer space comprising customer assets for a customer and a non-customer space, wherein the session data comprises location data for the extended reality privacy control and session data for the video feed, and receive first video data representing the environment within the remote asset facility, and augment, based on the session data for the extended reality privacy control, the first video data with the extended reality privacy control to generate second video data having at least a portion of the non-customer space occluded with the extended reality privacy control, and the communication circuitry coupled to an output device and further configured to output an augmented video feed of the environment, wherein the output device generates the augmented video feed for display via a display device.

In another example, a system includes an input device, an output device, and a computing device comprising processing circuitry configured to: obtain session data for a video feed comprising an extended reality privacy control for visually segmenting an environment within a remote asset facility into a customer space comprising customer assets for a customer and a non-customer space, wherein the session data comprises location data for the extended reality privacy control, receive, from the input device, first video data representing the environment within the remote asset facility, augment, based on the session data for the extended reality privacy control, the first video data with the extended reality privacy control to generate second video data having at least a portion of the non-customer space occluded with the extended reality privacy control, and output, to the output device, the second video data for an augmented video feed to a computing device of the customer.

The details of one or more examples are set forth in the accompanying drawings and the description below. Other features, objects, and advantages of the disclosure will be apparent from the description and drawings, and from the claims.

BRIEF DESCRIPTION OF DRAWINGS

Like reference characters denote like elements throughout the figures and text.

DETAILED DESCRIPTION

Figure 1:
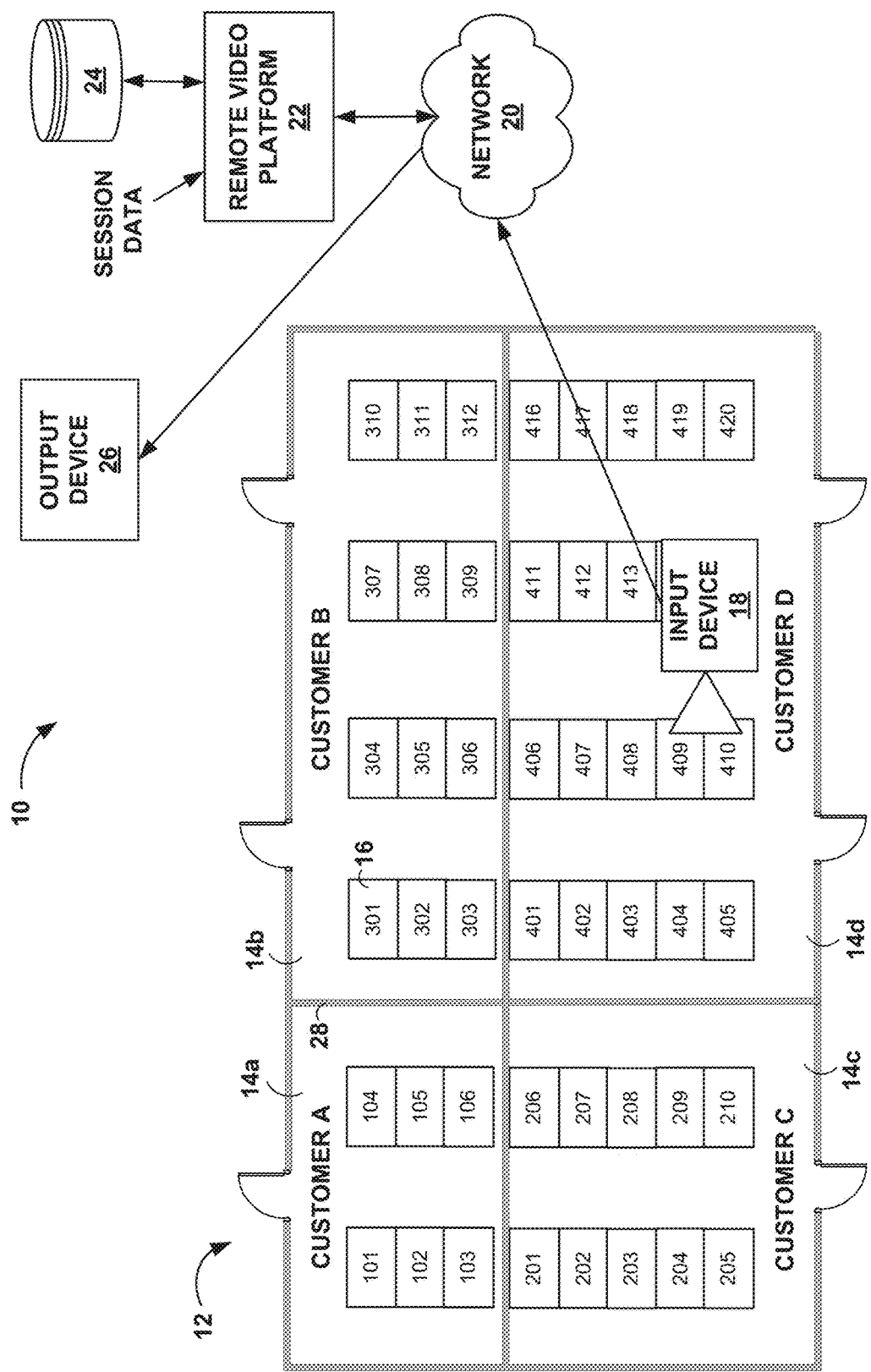
FIG. 1 is a block diagram illustrating an example asset security system for an example data center, in accordance with the aspects of the disclosure.

FIG. 1 is a block diagram illustrating an example remote video platform for an example remote asset facility, in accordance with the aspects of the disclosure. Data center 12 is an example of a remote asset facility and includes one or more assets. The assets may include physical structures related to power systems and cooling systems associated with controlling the environment within data center 12, such as temperature sensors, HVAC (heating ventilation and air conditioning) units, CRAC (computer room air conditioning) units, uninterruptible power supplies (UPSs), generators, PDUs (power distribution units), AHUs (air handling units), switchgears, chillers and power units, for example. In some examples, the assets include devices related to security, lighting, electrical, structural integrity, occupancy, or energy credits, for example. The assets may further include storage gear such as, for example, cages, cabinets, racks, or the like. The assets may be computing, networking, or data storage systems.

One or more assets in data center 12 may be owned by different customers co-located within data center 12. For example, data center 12 includes a plurality of spaces 14a-14d. In some examples, each spaces 14a-14d is owned by a different customer. For example, customer A may be assigned (e.g., leased) spaces 14a for locating assets of customer A, customer B may similarly be assigned space 14b, customer C may similarly be assigned space 14c, and customer D may similarly be assigned space 14d. Within each space 14a-14d, each customer A-D may locate additional assets, such as cabinets 16, racks (not shown), servers (not shown), or other assets that may be located in data center 12. In some examples, spaces 14a-14d are separated from each other, e.g., by walls 28. Spaces 14 may be customer cages. In some examples, walls 28 may provide at least some visibility from one cage to another, therefore potentially allowing a party or device located in one of spaces 14 to be able to view the assets located in another one of spaces 14. For example, walls 28 may include cage meshes, chain link, glass or plexiglass windows or walls, openings, etc. In some cases, the party may be an agent of a customer and therefore have visibility into spaces 14 assigned to other customers.

In some examples, infrastructure may partition data center 12 into separate spaces in which a customer space includes assets owned by a single customer and is surrounded by a non-customer space that includes groups of assets owned by different customers and other non-customer objects. An object within the non-customer space may be part of, for example, walls 28 of data center 12 and, for a variety of reasons, may be a potential leak of protected information for another customer (unless occluded by video platform 22). If the infrastructure permits a view of images of one or more assets that the single customer is not authorized to view, that customer may misappropriate that information to the detriment of another customer. In this example, a computing device of video platform 22 may occlude images of the non-customer space surrounding the customer's assets that is owned by different customers rather than obscuring each non-customer asset. Respective customer spaces of data center 12 may be defined in asset database 24 generally as session data, for example, referring to a video feed for each customer space to any corresponding customer(s).

Examples of the session data may include various attributes for representing a specific customer space (and any object therein) in the video feed for the corresponding customer. The video feed may be part of a remote assistance call or another example communication session between a technician in data center 12 and the customer. A set of example attributes may define an object in the specific customer space. One example attribute may indicate a cage number for a location of the specific customer space in the environment. Another set of example attributes may include location data for an extended reality privacy control in the video feed. Using coordinate systems, orientations of input device 18, a perspective of a camera unit for input device 18, space identifiers associated with different input video feeds, and so forth, the location data may indicate an area in the environment that substantially encompasses the non-customer space. By augmenting the extended reality privacy control to the area based on the location data, the extended reality privacy control occludes the non-customer space when displayed on a display device of the customer. Another set of example attributes may include specification data for the extended reality privacy control, which generally defines an appearance of the extended reality privacy control and any functionality enabled by the extended reality privacy control.

Consider, as an example, a video feed generated by augmenting privacy walls to walls 28 of data center 12 based on associated session data for customer A. Attribute information for the video feed may be stored in metadata for the privacy walls, which may include location data for overlaying the privacy walls onto first video data representing the cage in space 14a for customer A and specification data for generating the privacy walls in second video data. Attribute information of the privacy walls may include size data, position/pose data, texture data, and any other conceivable aspect of the privacy walls' appearance.

Remote video platform 22 may be connected to a network 20, which is connected to an input device 18 and an output device 26. Network 20 may include a private network associated with a provider, e.g., the provider of data center 12, a public network such as the Internet, a cloud network, a content distribution network, or other network for distributing video data. Although illustrated as a single entity, network 20 may include a combination of public and/or private networks. In some examples, network 20 may include one or more of a wide area network (WAN) (e.g., the Internet), a local area network (LAN), a virtual private network (VPN), or another wired or wireless communication network.

Input device 18 is located in data center 12, more specially in space 14*d* assigned to customer D, and generates video data that represents the physical environment of the remote asset facility. The generated video data may include images of customer spaces that may include assets. For example, input device 18 may include a camera unit (e.g., a video camera) capable of generating an input video feed. In some examples, the input video feed includes a live video feed. Although input device 18 is described herein as capturing an input video feed of data center 12, input device 18 may additionally or alternatively capture still images, capture still images from a video feed, or the like.

In some examples, a remote user, using an interface, directs motion of input device 18 by controlling an apparatus to which input device 18 is affixed. In some examples, input device 18 is movable throughout data center 12, such as, for example, on one or more tracks within data center 12. As another example, input device 18 may be attached to headset or otherwise transported by a human user throughout the data center 12. In some examples, the human user may have physical control over a mobile device having input device 18 and may manually move the mobile device between locations within data center 12 while using input device 18 to capture video data of any environment (e.g., scene) within that data center 12. In other examples, input device 18 rotates on one or more axes to change orientation. In some examples, input device 18 is stationary. Input device 18 may operate automatically, e.g., without a user physically present to operate input device 18.

Input device 18 sends, via network 20, the input video feed to a computing device of video platform 22 via network 20 and/or to a computing device of customer D who uses the cage in space 14*d*. Output device 26 may be communicatively coupled to the computing device of video platform 22 and/or to the computing device of customer D. This example customer and video platform 22 may be engaged in a video feed session where hardware/software components running on the computing device of video platform 22 generate an output video feed for transmission to the computing device of the customer. The output video feed may include an augmented video feed where captured video data is augmented with video data for presenting the extended reality privacy control.

Alternatively, the output video feed may be an unaugmented video feed in which the input video feed is not modified beyond a trivial degree (if at all). The unaugmented video feed may be suitable for live/real-time sessions (e.g., a remote assist call). In a number of ways, the above-mentioned hardware/software components facilitate generation of the augmented video feed by the computing device of customer D. For example, in addition to unmodified video data for the unaugmented video feed, the computing device of video platform 22 may communicate specification data as described herein for defining an appearance of the extended reality privacy control and location data as described herein for indicating an object and/or an area for overlaying the extended reality privacy control. The object and/or the area may be depicted in the unmodified video data; both occupy a portion of space 14*d*.

As an option, a human technician may operate input device 18 as described herein to capture an input video feed and manage a video feed session with customer D. The human technician, via input device 18, may select the extended reality privacy control and provide an indication of location data for overlaying the extended reality privacy control for an output video feed. Similar to the above-mentioned hardware/software components running on the computing device of video platform 22, the output video feed may be unmodified from the input video feed or may be augmented to include the extended reality privacy control. The human technician may employ the computing device of video platform 22 in a variety of roles, for example, for obtaining session data for customer D and space 14*d*. Alternatively, the human technician may use input device 18 exclusively and thus, handle the video feed session with customer D without support from the computing device of video platform 22.

In turn, the computing device for customer D may receive video data of the output video feed and (if needed) the location data and/or the specification data for augmenting the output video feed to include the extended reality privacy control. The computing device for customer D may receive such data from input device 18 and/or the computing device of video platform 22. The computing device for customer D may render the received video data into content configured for display on a display device. Customer D may interact with the content presented on the display device, for example, by changing a view of the input video feed. Customer D may interact with the extended reality privacy control in a number of ways, such as to annotate, to activate functionality, and/or the like; by way of some example interactions, customer D may effectuate change in their cage occupying space 14*d* at the remote asset facility. In an alternate configuration of data center 12, output device 26 may be the computing device of customer D, which receives, from input device 18, an instantaneous transmission of recorded video data such as when captured by a camera unit.

Although communications among video platform 22, input device 18, and output device 26 is illustrated as described as being transported by a network 20, other forms of communication links may be used. For example, video transmission links may couple input device 18 to video platform 22. Example video cable types for such video transmission links include composite video, S-Video, component video, High Definition Multimedia Interface (HDMI), and Digital Video Interface (DVI). In such examples, input device 18 sends the input video feed to video platform 22 via such video transmission links.

Video platform 22 communicates with asset database 24 via a network, e.g., network 20, to obtain data in order to identify a physical object within an environment being recorded by input device 18 (e.g., captured as image data) and/or determine if a customer is authorized to view that object (e.g., unauthorized). Asset database 24 may include data pertaining to the location, name, and/or ownership of assets in data center 12. In some examples, asset database 24 includes additional information about data center 12. In some examples, assets may have at least some identity data viewable within the input video feed. The identifying information may include a bar code, QR code, unique string, a graphic object, or other visual identifying information that uniquely identifies an asset to the video platform 22.

Video platform 22 sends the generated output video feed to output device 26 associated with the customer, via network 20. In some examples, the output video feed includes virtual reality video, augmented reality video, a live video feed, an image or set of images, or other video data. Output device 26 is not limited to any particular type of device, and may include a computer, a laptop computer, a virtual reality headset, an electronic personal digital assistance device, and/or a mobile electronic device, such as, for example, a smart phone, each having or being associated with a display device for displaying the output video feed to a user, such display devices including, e.g., a liquid crystal display, a presence-sensitive display, and a television or monitor.

Because walls 28 may be at least partially transparent, input device 18 may have visibility into spaces 14a, 14b, and 14c that are assigned to customers other than the customer assigned space 14d. As a result, the customer assigned space 14d may have visibility into spaces 14a, 14b, and 14c that may include assets belonging to other customers.

In accordance with techniques of this disclosure, remote video platform 22 receives first video data of an input video feed generated by input device 18 and generates second video data for an output video feed by augmenting the first video data with an example extended reality privacy control. In some examples, remote video platform 22 identifies, in the first video data, a representation (e.g., in an image) of walls 28 for visually segmenting an environment within the remote asset facility into a customer space including customer assets for a customer and a non-customer space. By augmenting (the visualization of) walls 28 with corresponding image data of the example extended reality privacy control. To illustrate by way of an example, output device 26 generates image data for the augmentation by rendering the example extended reality privacy control in an augmented video feed as an opaque graphic image (e.g., a polygon).

Video platform 22 may generate the output video feed based on whether the customer is authorized to view one or more objects (e.g., non-customer assets) in the input video feed. The one or more objects that the customer is authorized to view may be the customer's own asset(s), a different customer's asset(s), or any object(s) belonging to the facility and not to any customer. Video platform 22 may select, for potential augmentation with an extended reality privacy control, any object occupying an area, a perimeter, or a volume designated for the customer (and their assets) within an environment of the remote asset facility.

Video platform 22 may enable customer interaction with authorized objects in data center 12 by running a user interface on a customer device while a customer is viewing an incoming video feed. Of course, the incoming video feed to the customer device may refer to an output video feed from video platform 22. The user interface may be graphical user interface (GUI) for visualizing possible operations with authorized objects (e.g., physical objects or logical objects). The output video feed may be embedded as content in a software program and code within that program may be executed to expose functionality (e.g., an API) for the customer or another human user to invoke, for example, by way of user input. Input device 18 (e.g., a mobile device) may generate the GUI via a display device such as an electronic or computer display. The human user may provide user input indicating a particular object within a particular cage 14 to modify into an extended reality privacy control.

In response to the user input, input device 18 may perform some functionality for the indicated object. For example, input device 18 may interpret a gesture, speech, touch, and/or other input as an annotation for the indicated object, The user input may be interpreted by the GUI as an annotation for the indicated object as described herein.

The present disclosure envisions a variety of extended reality privacy controls that remote video platform 22 (or simply "video platform 22") may use to augment an input video feed when generating the output video feed. As one example privacy control, video platform 22 may overlay a polygon onto image data corresponding to a barrier (e.g., walls 28) with non-customer space to prevent unauthorized assets from being viewed by a customer. As another example privacy control, video platform 22 may overlay a boundary onto image data corresponding to a periphery of customer space. Both the polygon and the boundary embodiments are opaque with a single color or have multiple colors. The extended reality privacy control may resemble an object in actual reality, or it may be unique (e.g., a graphic). Furthermore, video platform 22 may configure the extended reality privacy control to perform an operation or otherwise have a presence and/or a purpose in an extended reality being created for the input video feed/output video feed. As described in further detail below, example operations performed by the extended reality privacy control include annotation of content (e.g., label) and/or metadata, adjustment of attribute information (e.g., size/shape/dimensions, color, and/or the like), and so forth. As an option, the extended reality privacy control may be adjusted into a different user interface (UI) component type such as a menu, a container of multiple UI components, and/or an applet.

The extended reality privacy control may be configured to expose an interface through which user input activates functionality in the extended reality. As described in detail below, a touch input may invoke a function call to annotate an image representation of the extended reality privacy control, for example, with identity data. The function call may generate a GUI object for accepting, as input, the identity data (e.g., via a keyboard) and communicating the identity data to video platform 22. Hardware/Software for this functionality may be implemented in input device 18, output device 26, video platform 22, or distributed amongst input device 18, output device 26, and/or video platform 22. Some extended reality privacy controls perform an operation or otherwise have a presence and/or a purpose in an extended reality being created for the input video feed/ output video feed.

In some examples, the extended reality privacy control may be a logical object that is presented in a video feed when corresponding image data is rendered in video data for that video feed. The logical object may be associated with hardware/software component(s) for performing the operation or otherwise affecting the above-mentioned extended reality in some manner. Specific positions on that logical object may trigger performance of the operation by way of executing the hardware/software components. Location data for these positions may be relative to a center, thereby allowing for adaption of the logical object for any screen size. Video platform 22 may activate their associated hardware/software components in response to indications of user input at the relative positions.

Any extended reality privacy control configured with functionality implemented in hardware/software component(s) may be considered a logical object. Video platform 22 may overlay any example logical object onto a location (e.g., an area) of a physical object. Video platform 22 may insert the logical object into an area without any object in it or an area without any customer assets (i.e., non-customer space). The logical object (or another extended reality privacy control) may be rendered into an image background or image foreground, for example, as part of virtual infrastructure (e.g., a virtual boundary/barrier).

As an example, input device 18 may generate the UI to accept an annotation comprising identity data (including location data) for an object. Input device 18 may store the annotated identity data on a network store within data center 12. As an alternative, input device 18 may access the network store to retrieve matching identity data for an object. As another example, input device 18 may generate the UI to allow the human user to define appropriate location data for performing the augmentation as described herein. As explained in further detail below, a technician within the remote asset facility may invoke functionality via the UI to establish an object, for example, walls 28, as at least part of an extended reality privacy control. For example, the technician may use input device 18 to view an input video feed presenting a portion of walls 28 and then, via a touchscreen, select walls 28 for overlaying corresponding image data for an opaque polygon.

To illustrate using a layout presented in FIG. 1 for data center 12, the output video feed communicated to a customer may be configured to display their respective cage 14 and an opaque boundary instead of walls 28, thereby eliminating any potential view into a different cage 14 of another customer. In this manner, a particular customer is only permitted to view authorized assets, and other customers are not permitted to view those customer assets unless the particular customer authorizes such a view. Consider an example where customer A may own cage 14a and customer B may own cage 14b, customer A and customer B may be provided a shared video feed through which only cabinets 16 in cage 14a are viewable to customer A and, similarly, only cabinets 16 of cage 14b are viewable by customer B. To customer A, the shared video feed occludes image data for cabinets 16 of cage 14b with image data for the at least one boundary (or another privacy control).

Video platform 22 may leverage a number for techniques for determining suitable location data in an image for augmentation with an extended reality privacy control. In general, the location data may identify a location of a (virtual) boundary or a (physical) barrier for customer object(s) within a general environment. The location data may be pre-determined by input device 18 at a time of recording new video data or determined at a time of augmentation. An example environment may be a scene from a perspective of a single (e.g., standard) origin point (e.g., of a camera unit of input device 18) and representative of a customer space or of the entire remote asset facility. An image (or a portion thereof) may be further analyzed to determine additional data (e.g., depth parameters) for objects in the input video feed described herein.

Input device 18 may have location data associated with it as well as any object (e.g., asset or privacy control) within data center 12. For example, the location data may denote the location and/or orientation of input device 18 in data center 12. In some examples, the location data includes Cartesian coordinates to denote the location of input device 18 in data center 12. In some examples, the location data identifies a hall, room, aisle, cage, or other area within the data center 12 viewable from a perspective of input device 18. In some examples, the location data includes an altitude and azimuth to denote the orientation of input device 18. The location data may further include Global Positioning System (GPS) data or any other data relating to the location of input device 18. For example, the location data may include geofencing data relating to an area or space within the data center 12 viewable by the input device 18. In some examples, input device 18 sends the location data to video platform 22 via network 20. Additionally, or alternatively, video platform 22 may obtain or receive the location data from another source.

Some techniques may apply concepts of computer vision (e.g., object identification/pattern recognition concepts) for occluding images of one or more assets that the customer is not authorized to view from the input video feed. One example technique may use these concepts to segment an image into a set of objects (e.g., a set of foreground objects) and a background (e.g., including individual background objects). Using the segmented image, video platform 22 may modify image data of an object to achieve the occlusion described herein. This object may be similar in nature to a physical barrier segmenting the customer space from the non-customer space.

One example technique for video platform 22 is to implement, as an example object recognition mechanism, a machine learning model for selecting an object with suitable location data for an augmentation of an extended reality privacy control. The object recognition mechanism may include software code that applies the machine learning model to image features in order to identify, amongst a set of objects in an image, an object for the augmentation. In some examples, video platform 22 may use a motion tracking algorithm, a pixel classification technique, a simultaneous localization and mapping (SLAM) technique, a marker-based identification technique, a markerless-based identification technique, a video editing technique, or any other applicable technique.

Another example technique may employ an encoding scheme where a visual graphic encodes identity data for one or more assets in a customer space or another environment. The encoding scheme may leverage a database storing QR codes that map to respective ones of the plurality of assets. To illustrate by way of example, a visible graphic representing a QR code may be affixed to (e.g., a surface of) an identifiable asset within a particular cage 14, and a human user may capture that QR code by employing input device 18 (e.g., an image scanner as part of a camera unit for capturing video data of the particular cage 14 or as a separate unit). Input device 18 may communicate that captured QR code to video platform 22, which performs a lookup operation with the database to access matching identity data for the identifiable asset. Another example QR code may encode data identifying walls 28 as a possible location for a privacy control such that a human user may scan the QR code and identify walls 28 as an object to be made non-transparent. As described herein, augmenting this object with an extended reality privacy control (e.g., an opaque boundary) is operative to occlude images of one or more assets that the customer is not authorized to view. A visible graphic representing the other example QR code may be affixed to walls 28 or another object.

Another example technique may implement a mechanism for generating a user interface (UI) (e.g., natural user interface) and coupled this mechanism to an object such that a human user (e.g., facility employee) may avail the UI to retrieve/enter identity data for that object. This object may be found appropriate for augmentation with an extended reality privacy control, for example, if the object is positioned on a periphery of customer space and can be modified to occlude one or more assets that the customer is not authorized to view.

The UI may expose functionality (e.g., an API) for the human user to invoke, for example, by way of user input. Input device 18 (e.g., a mobile device) may generate the UI via a display device such as an electronic or computer display. The human user may provide user input indicating a particular object within a particular cage 14 to modify into the privacy control. In response to the user input, input device 18 may perform some functionality for the indicated object. For example, input device 18 may interpret a gesture, speech, touch, and/or other input as an annotation for the indicated object, the user input may be interpreted by the UI as an annotation for the indicated object.

Figure 2:
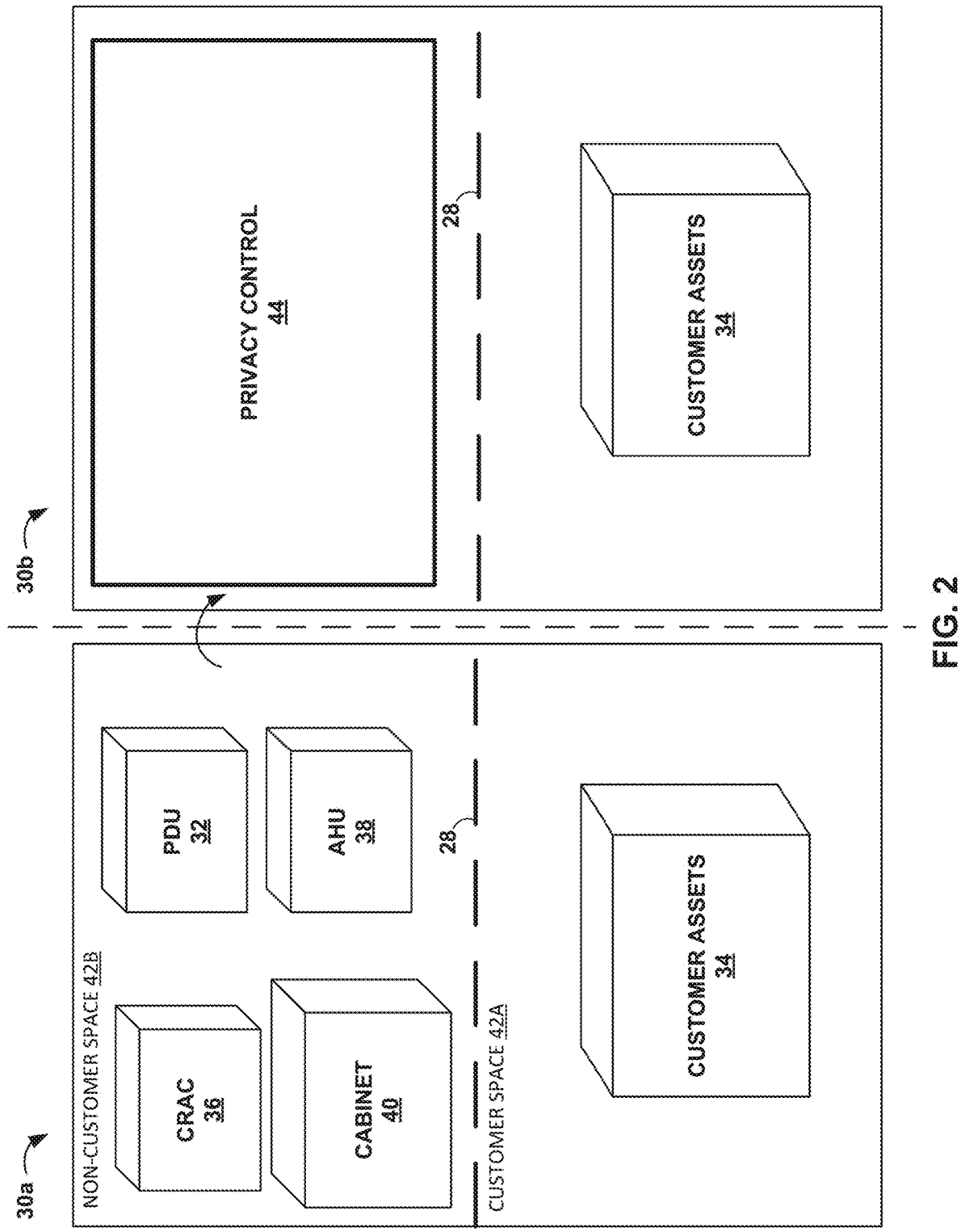
FIG. 2 is a block diagram illustrating an example input video feed and an example output video feed, in accordance with the aspects of the disclosure.

FIG. 2 is a block diagram illustrating an example input video feed 30*a* and an example output video feed 30*b*, in accordance with the aspects of the disclosure. For example, input video feed 30*a* includes the input video feed that a computing device associated with a remote video platform (e.g., video platform 22 of FIG. 1) receives from an input device, and output video feed 30*b* includes the output video feed generated by the remote video platform and sent to an output device. A human technician may operate the computing device, or the computing device may operate autonomously in a remote asset facility.

Input video feed 30*a* may include a plurality of assets. For example, input video feed 30*a* includes a PDU 32, a cabinet 40, a cage 34, a CRAC 36, and an AHU 38. In other examples, input video feed 30*a* may include any number or type of assets in accordance with the aspects of the disclosure. The plurality of assets in input video feed 30*a* may be owned by different customers. For example, cage 34, CRAC 36, and AHU 38 may be authorized for viewing by a first customer while PDU 32 and cabinet 40 are not authorized for viewing by the first customer and therefore, considered non-customer space with respect to the first customer. For example, cabinet 40 may be owned by a second customer.

Privacy control 44 may be defined as an extended reality privacy control such as those described herein. Privacy control 44 in example of FIG. 2 represents graphical content that is rendered from image data. Privacy control 44 may include an execution element (e.g., a link) coupled to logic for performing one or more operations, for example, in response to user input. As an alternative and based on authorization information for these assets, privacy control 44 may define a boundary to segment an environment being viewed in input video feed 30*a* into customer space 42A for the first customer, which includes cage 34, CRAC 36, and AHU 38, and non-customer space 42B for the first customer, which includes PDU 32 and cabinet 40. It should be noted that non-customer space 42B corresponds to the first customer and thus, may include at least a portion of a customer space for the second customer.

Asset security system 10 including the remote video platform in accordance with the aspects of the disclosure allows operators for the first customer to view its assets without being able to view the assets of another customer due to rendering privacy control 44 to overlay non-customer space 42B. For example, output video feed 30*b* may be the output video feed generated and output by the remote video platform. In this example, the output video feed 30*b* may be for the first customer, e.g., the customer that owns and is authorized to view cage 34, CRAC 36, and AHU 38. Output video feed 30*b* includes the assets owned by the first customer, e.g., cage 34, CRAC 36, and AHU 38, and privacy control 44 in place of a substantial portion of non-customer space 42B where PDU 32 cabinet 40 are located. The video platform 22 modifies input video feed 30*a* to include corresponding image data for privacy control 44 in place of image data for walls 28 (thereby, occluding at least PDU 32 and cabinet 40) in the case where PDU 32 and cabinet 40 are owned by the second customer and the first customer is not authorized to view PDU 32 and cabinet 40. In this way, a first customer may view its assets, but the assets of another customer are occluded to improve the privacy of the second customer.

As an alternative, the above-mentioned computing device associated with the remote video platform may generate output video feed 30*b* for a computing device of the first customer without modifying input video feed 30*a*. To accompany output video feed 30*b*, the above-mentioned computing device may further generate data (e.g., session data) including attribute information for the computing device of the first customer to use in overlaying walls 28 with privacy control 44 to generate second video data having at least a portion of non-customer space 42D (which includes PDU 32 and cabinet 40) occluded with the extended reality privacy control. This attribute information may include data identifying an object (e.g., a 3D object) for the computing device of the first customer to use for augmenting walls 28 and, in some examples, content for the object. The attribute information may further include a position, a size, and other data for rendering the object on a display device of the computing device of the first customer such that the object occludes walls 28 and also blocks a view of non-customer space 42B. Upon completing the augmentation of privacy control 44, the computing device of the first customer may proceed to output the second video data (e.g., augmented video data) for display at a display device.

Although FIG. 2 is described with respect to five assets and two customers, any number of assets and customers are contemplated to be within the scope of the disclosure.

Figure 3:
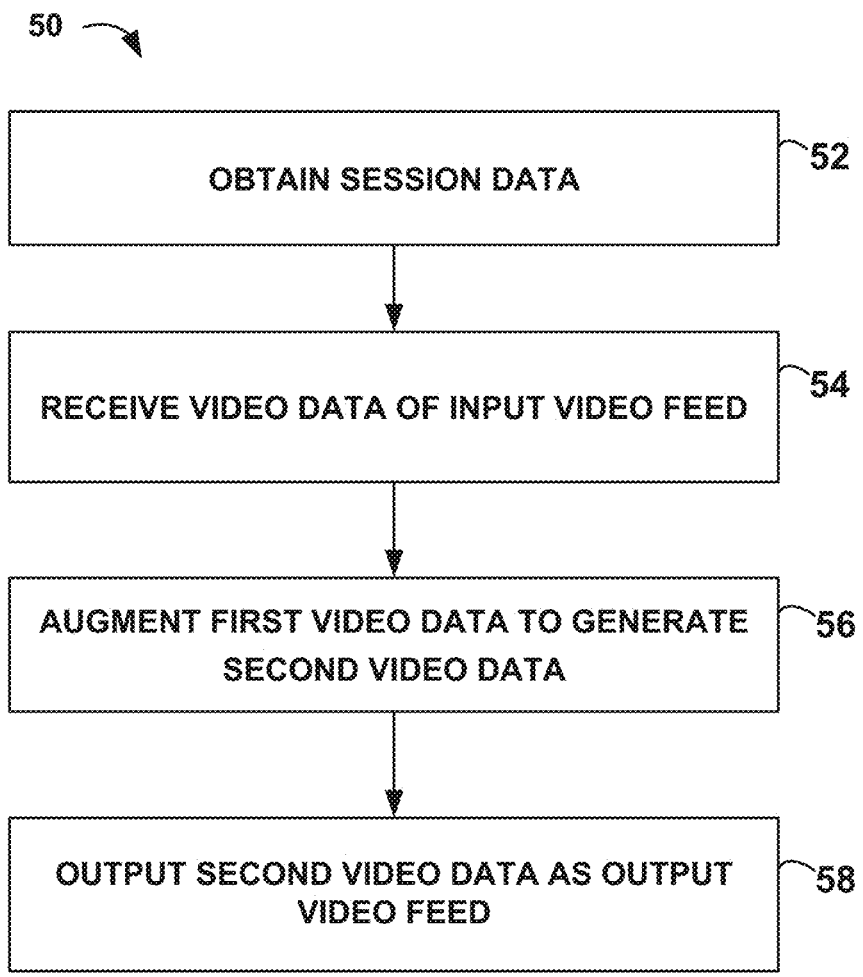
FIG. 3 is a flow diagram illustrating an example mode of operation for viewing one or more assets, in accordance with the aspects of the disclosure.

FIG. 3 is a flow diagram illustrating an example mode of operation 50 for viewing one or more assets, in accordance with the aspects of the disclosure. FIG. 3 will be described with respect to asset security system 10 from FIG. 1 for ease of description only. A person having ordinary skill in the art will recognize and appreciate that the example mode of operation of FIG. 3 may be performed in a variety of ways.

Mode of operation 50 includes obtaining, by a computing device, session data for a video feed comprising an extended reality privacy control for visually segmenting an environment within a remote asset facility into a customer space comprising customer assets for a customer and a non-customer space, the session data comprising location data for the extended reality privacy control (52); receiving, by the computing device, an input video feed that includes first video data (e.g., images) representing an environment located within a data center (54); augmenting, by the computing device and based on the session data for the extended reality privacy control, the first video data with the extended reality privacy control to generate second video data having at least a portion of the non-customer space occluded with the extended reality privacy control (56); and outputting, by video platform, the second video data as the output video feed (58).

The above-mentioned computing device may be handled by a human technician of the remote asset facility and/or operate in association with video platform 22 to perform mode of operation 50. In one example computing device, input device 18 may receive the video data of the input video feed of the environment of the remote asset facility. Output device 26 may use the second video data to generate the output video feed (e.g., an augmented video feed) for display on a display device. In one example, output device 26 may include (e.g., forwarding) hardware, operative as a network interface controller (NIC), for enabling transmission of the output video feed to a computing device. This computing device may be a remote computing device (e.g., to the remote asset facility and/or video platform 22) of which the customer may operate (e.g., as a mobile device) for receiving the output video feed. With the remote computing device, the customer may avail an electronic/computer display to view content representing the second video data of the output video feed. The present disclosure describes the output video feed as an augmented video feed where the input (or first) video feed is augmented (e.g., modified) to include an extended reality privacy control, replacing the first video data with the second video data.

As an alternative, output device 26 may be limited to the display device for display of the output video feed. This may be achieved by configuring output device 26 as a computer display on a local computing device of video platform 22. As an option, output device 26 may operate both the NIC and the display device (e.g., the computer display) for displaying the output video feed.

The customer behind a remote access call may operate the remote computing device to receive the augmented video feed for presentation on the computing display. In the remote asset facility, a local computing device having a suitable computer display for displaying content from the output video feed may be advantageous and beneficial to facility employees charged with servicing the remote assess call. The displayed content may provide a facility employee with an original, non-augmented video feed of the same environment to be viewed by the customer.

Mode of operation 50 may further include obtaining location data for a number of objects in the data center, including any extended reality privacy control of a customer space. Generally, any physical object in the data center may be conferred as an example extended reality privacy control. To visually segment assets of the customer space from other (non-customer) assets, physical objects for respective extended reality privacy controls may (e.g., combine to) define a boundary (or a portion thereof) between the customer space and the non-customer space. Mode of operation 50 may further include receiving, by video platform 22, first video data of a video feed generated by a camera unit. In the receiving of the first video data, mode of operation 50 may further include capturing, by the camera unit, one or more images (e.g., a visual graphic or graphical image).

Mode of operation 50 may further include augmenting, based on the location data for the extended reality privacy control, the first video data with the extended reality privacy control to generate second video data having at least a portion of the non-customer space occluded with the extended reality privacy control. Mode of operation 50 may further include generating, from the second video data, an augmented video feed for output via a NIC of a facility computing device (e.g., a computing device of an employee) and/or a computer display of a client computing device. The extended reality privacy control may be configured to expose an interface through which user input activates functionality in the extended reality. Touch or tactile input at a certain screen location of the computer display may invoke a function call to annotate an image representation of the extended reality privacy control, for example, with identity data. The function call may generate a GUI object for accepting, as input, the identity data (e.g., via a keyboard) and communicating the identity data to video platform 22.

Hardware/Software for this functionality may be implemented in input device 18, output device 26, video platform 22, or distributed amongst input device 18, output device 26, and/or video platform 22. Some extended reality privacy controls perform an operation or otherwise have a presence and/or a purpose in an extended reality being created for the input video feed/output video feed.

A computing device for video platform 22 may leverage sensing circuitry to access up-to-date and accurate location data for a specific physical space within the remote asset facility. The present disclosure describes a number of examples where video platform 22 benefits a customer assuming ownership/control over that specific physical space and then, housing various customer assets in their customer space. Coupled to one or more sensors configured to sense a number of objects within the remote asset facility, the sensing circuitry may generate location data for each individual object within the customer space that qualifies as the extended reality privacy control as described herein. Network 20 may facilitate transmissions of (recent) location data to video platform 22, or to an external storage device, where a database maintains, in one or more records, current location data for respective ones amongst visible objects in the remote asset facility.

In some examples, asset database 24 maintains record data indicative of respective locations for the objects within the remote asset facility. Again, the extended reality privacy control may be augmented to any physical object of one or more of a number of types, such as a customer asset, an asset for a different customer (i.e., non-customer asset), and/or an object belong to the remote asset facility including infrastructure. In some examples, video platform 22 uses the asset database 24 to determines which objects shown in the input video feed can potentially be repurposed as extended reality privacy controls. Video platform 22 may use a current location of an object shown in the input video feed to identify, e.g., using a look-up table, the object as an example extended reality privacy control or another object type. Other alternative examples may enable such a determination with objects that are not visible in the input video feed. Video platform 22 may add various information to asset database 24, for example, by storing a Boolean value to designate an object as a potential extended reality privacy control. Video platform 22 may identify an example extended reality privacy control shown in the input video feed using data other than the location data.

In one example, the computing device of video platform 22 obtains the location data via network 20. The location data may denote a location and/or an orientation of an identifiable physical object within the remote asset facility. Besides an extended reality privacy control and/or an asset, the identifiable physical object may be an electronic device such as input device 18 or a mobile device of a facility employee. In some examples, video platform 22 uses the location data to identify video data for augmenting with the extended reality privacy control. Suitable location data for an example extended reality privacy control may use Cartesian coordinates, polar coordinates, GPS data, geofencing data, or other location indicia or may use identifying information extracted from images of objects in an input video feed. In some examples, a visual graphic (e.g., a QR code) may encode identity data for one or more objects within the customer space including any extended reality privacy control. The visual graphic may include a bar code, QR code, unique string, or other visual encoding for information that uniquely identifies an object as the extended reality privacy control to the video platform 22.

If video platform 22 determines that the customer is not authorized to view one or more assets in an input video feed, video platform 22 generates an output video feed that overlays, as an example privacy control, corresponding image data of a boundary (e.g., an opaque graphic image) to occlude the one or more non-customer assets. For example, video platform 22 may project a texture map onto non-customer space in order to blur, censor, block, or otherwise obscure the one or more non-customer assets. In this way, the customer receiving the output video may not be able to identify or view assets that they are not authorized to view, e.g., assets owned by another customer, while still being able to view its assets. Video platform 22 may configure the example privacy control with program code (e.g., processor-executable instructions) to enable interaction and other capabilities by the customer and/or a remote facility technician. This can be accomplished via an interface (e.g., a GUI with selectable operations including API functions to invoke). In some examples, the example privacy control may be an example extended reality privacy control as described herein.

Figure 4:
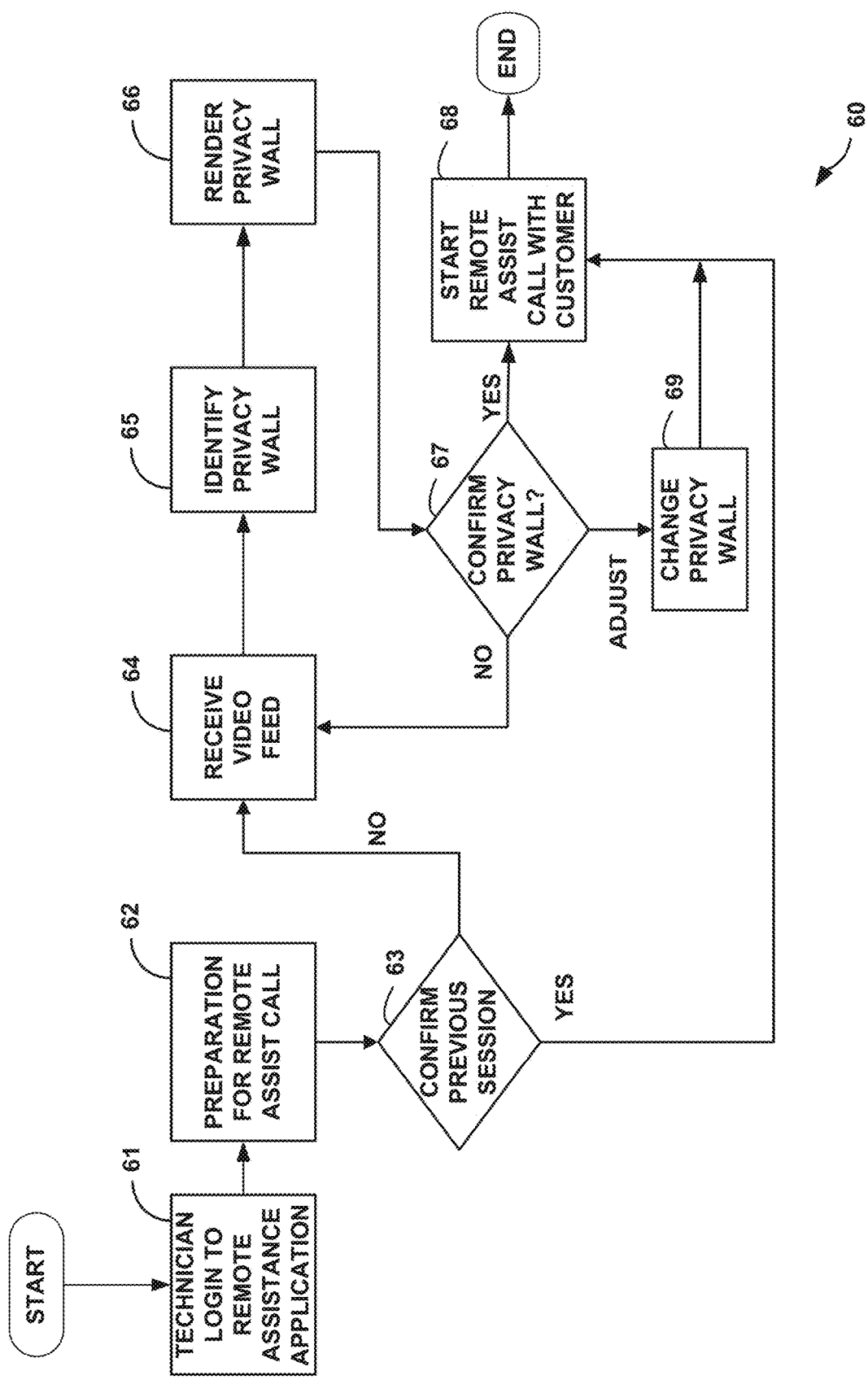
FIG. 4 is a flow diagram illustrate an example mode of operation for completing an order of a support service for the example data center of FIG. 1.

FIG. 4 is a flow diagram illustrate an example mode of operation 60 for completing an order of a support service for the example data center of FIG. 1. FIG. 4 will be described with respect to asset security system 10 from FIG. 1 for ease of description only. A person having ordinary skill in the art will recognize and appreciate that the example mode of operation of FIG. 4 may be performed in a variety of ways. Certain terms used elsewhere in this disclosure may be used differently in the following. For instance, FIG. 4 refers to a client who is a customer of data center 12 of FIG. 1 and initiates a remote access call to data center 12 regarding a support service for their own objects (e.g., customer assets).

Mode of operation 60 includes a technician completing a login or authentication sequence (i.e., Single-Sign-On (SSO)) login with video platform 22 in order to gain access to data center 12 (61) followed by preparation for remote assist call, as a type of support service offered to customers of data center 12 (e.g., a remote asset facility) (62). In one example, video platform 22 may be programmed to authorize the remote assist call in response to receiving a completed order form from the client who, as a data center customer, is purchasing support service(s) for their data center (62) under their existing customer subscription or a new subscription specifying which a colocation facility provides the remote assist call or other support service(s). When the customer leases space from far away from their physical location, the support services allow the customer to manage their remote customer assets located in such leased space without having to send technical staff to the colocation facility. Support services typically refer to tasks such as securing cabling, checking port numbers, observing or reporting indicators on equipment, rudimentary observation of the environment, and server reboots. Other more complex tasks that need someone physically present in the colocation facility include setting up a firewall, managing data center equipment including placement, media and supply management, complex cable configurations, equipment testing, rack and stacking services, setting up and maintaining backups, operating system and server installation, remote server restarts, cloud cross-connect, and general troubleshooting. These services are accomplished remotely without the customer having to be present at the colocation facility.

After completing the customer order, mode of operation 60 may include determining, by video platform 22, whether to use (i.e., confirm) a privacy wall from a previous support session (e.g., previous remote call) for augmentation with (shared) video data of a same environment (63). There are a number of ways to present a query (e.g., regarding confirmation of the privacy wall) on the GUI presented to the client.

In response to receiving client confirmation (YES of 63), mode of operation 60 may proceed to combine the privacy wall with appropriate video frames of video data, thereby commencing a video feed of the environment and terminating mode of operation (END). In response to a lack of client confirmation or a client denial (NO of 63), mode of operation 60 may include receiving, by video platform 22, a video feed from an input device (64).

Prior to outputting the same video feed to a display device, mode of operation 60 includes identifying a privacy wall (65), rendering the privacy wall (66), and responsive to confirmation by the client (YES of 67), to commence shared video for starting the remote assist call with the customer (68). The client, however, may indicate a client denial or there may be a lack of client confirmation (NO of 67) in which case mode of operation 60 may return to the received video feed (64) and continue processing more video data. Otherwise, mode of operation 60 includes changing the privacy wall (69), for example, by adjusting the privacy wall in terms of presentation (e.g., attribute(s) such as size, orientation, depth, appearance such as color or texture, and/or the like) and/or functionality activated in response to human user interaction.

The shared video refers to a visualization of a same environment that both the client and the technician can perceive. The shared video facilitates the remote assist call in a number of ways; to illustrate by way of example, having shared video improves collaboration between the technician and the client and further benefits the data center provider (e.g., reduction in work-time for the support service).

The customer may view the output video feed from a local computing device running a customer portal application communicatively coupled to video platform 22 and the colocation facility. The customer portal application may run a GUI for presentation to the client. The client may use the GUI to invoke various functionality as described herein (e.g., extended reality functionality). After viewing their assets, the customer may select a desired support service to apply to the customer assets and submit that selection via the customer portal application. Video platform 22, in turn, may process the selection and then, schedule performance of the desired support service. Video platform 22 may create a ticket for the desired support service. Alternatively, in some case, the customer may communicate via phone or text message with the operator located in the customer space and informed by the output video feed, direct the technician to perform some support service on customer assets within the customer space.

Video platform 22 may achieve the above shared video aspect of the remote assist call using a number of techniques. In one example, mode of operation 60 may include triggering, by video platform 22, an analysis (e.g., a scan) to identify a potential privacy wall, which may be pre-determined or selected contemporaneously with the initial video feed. The analysis may include receiving from the technician user input directing the video platform 22 to an area (e.g., an object or a structure within the facility) of the initial video feed for the potential privacy wall.

In some examples, mode of operation 60 includes determining, by video platform 22, whether to use (i.e., confirm) the above identified privacy wall in the augmented video data (67). Using the above-mentioned GUI, the client may interact with a GUI object configured for the privacy wall in the augmented video data and/or a separate GUI object (e.g., a menu) with a selectable option for confirmation. In response to receiving client confirmation (YES of 67), mode of operation 60 may include starting, by video platform 22, the remote assist call with the shared video capability of the same environment with the colocation facility (67). To successfully start the remote assist call, mode of operation 60 may include augmenting, by video platform, the privacy wall with appropriate video frames of video data, thereby commencing a video feed with augmented video data of the environment and terminating mode of operation 60.

The privacy wall may be configured as an extended reality privacy control as described herein such that any interaction with the privacy wall may invoke various extended reality functionality. An interaction mechanism, via the above-mentioned GUI or a similar separate GUI component, may enable some example operations of such a privacy wall including an annotation of data (e.g., identity data for text data and/or metadata) and/or an adjustment in appearance (e.g., changing cage wall dimensions).

There may be another option to deny the privacy wall; alternatively, a denial can be assumed, for example, if triggered by a timer set to elapse after a time period. In the illustrated example flow of FIG. 4, there is an option to adjust (e.g., manually and/or automated) the privacy wall (e.g., in size) in order to satisfy the client's requirements (68).

Instead of waiting for client confirmation of the potential privacy wall (e.g., with a preview), mode of operation 60 may include generating, by video platform 22, an output video feed including the augmented video data and then, outputting, via the output device, the output video feed for the client to view on a computer display. The output video feed is limited to authorized image data, which restricts the client to viewing video data of their customer space encompassing authorized objects (e.g., object images).

In general, mode of operation 60 is performed upon receiving, by video platform 22, subsequent customer requests for the support service(s) for which data center professionals in the colocation facility handle. As an example, an operator experiencing downtime (e.g., poor quality of service) may submit a request by way of a customer application (e.g., portal) and/or calling the colocation facility. The operator, via their network, may be unable to access their assets, or the needed operation to their assets may not be remotely performable. The operator may indicate, in the request, a specific support service followed by an data center, cage, cabinet, and other examples of location data. Mode of operation 60 may further include identifying, by video platform 22, an operator as the above customer that is to receive an output video feed corresponding to a support service; generating, by video platform 22 from the input video feed and based on the operator, an output video feed that overlays (at least a portion of) image data for non-customer assets with corresponding image data of an extended reality privacy control while retaining image data for customer assets; and sending, by the remote video platform and to an output device, the output video feed, wherein the output video feed includes at least one obscured image of one or more non-customer assets.

To illustrate by way of an example remote assistance call, video platform 22 may receive an input video feed from a data center professional operating a camera (e.g., an example instance of input device 18) for capturing video data of an environment having at least the customer space. Video platform 22 may obtain location data for an extended reality privacy control to visually segment an environment within a remote asset facility into a customer space comprising customer assets for a customer and a non-customer space. Video platform 22 may augment, based on the location data for the extended reality privacy control, the first video data with the extended reality privacy control to generate second video data having at least a portion of the non-customer space occluded with the extended reality privacy control. Video platform 22 may output the second video data for display at a display device.

Further illustrating the above example, the customer may submit their requests for support service(s) but those requests may reflect a need upon the customer for more information regarding customer assets prior to selecting a specific support service for the data center professional to perform. The customer may desire a view into the colocation facility to visualize the customer assets and diagnose the technical issue causing the downtime. It should be noted that the visualization explained below may be its own support service for the customer to select.

To fulfill the immediate need indicated by the customer request, video platform 22 may provide the customer with an output video feed of a scene where each customer asset is visualized but each non-customer asset is obscured (e.g., by way of image occlusion). The scene in the output video feed may be a representation of a portion of the colocation facility (e.g., asset security facility 10 of FIG. 1). Starting with an input video feed where the above scene initially includes a representation of a portion of the colocation facility in which non-customer assets are located, video platform 22 may overlay image data on location data for a boundary or barrier segregating the customer space from the non-customer space of non-customer assets. The boundary (or barrier) may demarcate an area (e.g., a customer space) for the customer assets from other areas of the facility. The boundary may share locations of objects that may form at least a portion of a physical boundary surrounding the assets in the customer space and separating the customer space from any non-customer space. There may be a virtual boundary indicating a previous privacy control from a prior remote assistance call with the same customer.

Figure 5:
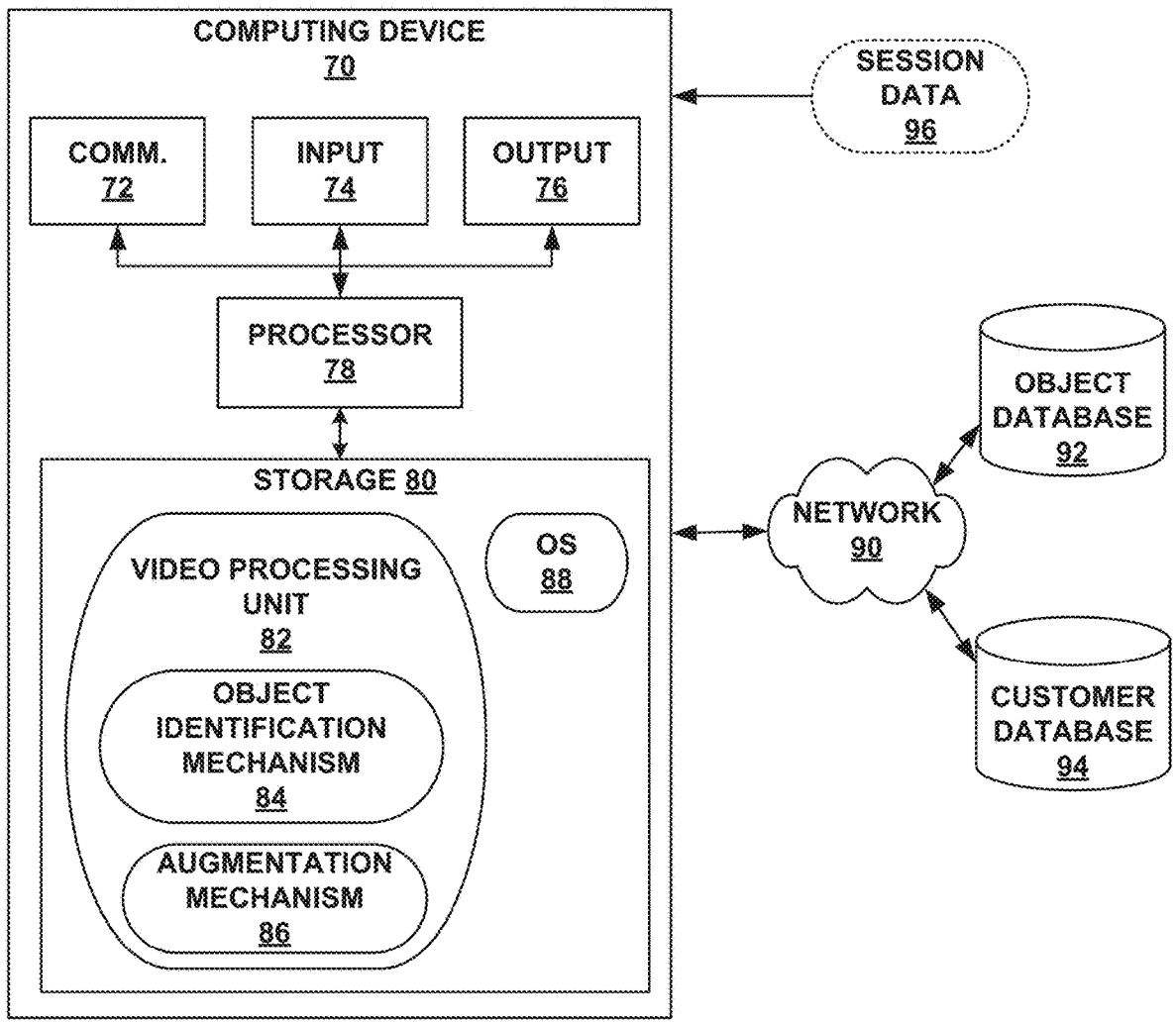
FIG. 5 is a block diagram illustrating an example remote video platform, in accordance with the aspects of the disclosure.

FIG. 5 is a block diagram illustrating an example computing device 70, in accordance with the aspects of the disclosure. Computing device 70 may be operated by customer D of FIG. 1 or controlled by or representing video platform 22 of FIG. 1. FIG. 5 will be described with respect to assets for ease of description only. A person having ordinary skill in the art will recognize and appreciate that the example remote video platform of FIG. 5 may be performed with respect to areas in a data center, groups of assets in a data center, or the like in addition to or alternatively to assets.

Computing device 70 includes one or more communication units 72, one or more input devices 74, and one or more output devices 76. Computing device 70 includes one or more processors 78 and one or more storage devices 80. The one or more storage devices 80 include operating system 88 and video processing unit 82. One or more of the devices, units, storage areas, or other components of computing device 70 may be interconnected to enable inter-component communications (physically, communicatively, and/or operatively). In some examples, such connectivity may be provided by through a system bus, a network connection, an inter-process communication data structure, or any other method for communicating data. Video processing unit 82 may be executed in a distributed manner by multiple servers, of which computing device 70 is an example. Computing device 70 may be equivalent to video platform 22 as described herein for FIGS. 1-3.

One or more input devices 74 of computing device 70 may generate, receive, or process input. Such input may include input from an input device, such as, for example, an input video feed from a video camera. As such, one of input devices 74 may be include or be coupled to a video cable interface and may in some cases include processing circuitry for processing the input video feed and storing corresponding video data to storage 80 for processing by video processing unit 82. Additionally, or alternatively, one or more input devices 74 may generate, receive, or process input from a keyboard, pointing device, voice responsive system, button, sensor, mobile device, control pad, microphone, presence-sensitive screen, network, or any other type of device for detecting input from a human or machine.

One or more output devices 76 of computing device 70 may generate, transmit, process, or display output. In some examples, the output may be tactile, audio, visual, and/or video output. For example, the output of the one or more output devices 76 may be an output video feed. Output devices 76 may include a display, sound card, video graphics adapter card, speaker, presence-sensitive screen, one or more USB interfaces, video and/or audio output interfaces, or any other type of device capable of generating tactile, audio, video, or other output. In some examples, output devices 76 may include a display device, which may function as an output device using technologies including liquid crystal displays (LCD), quantum dot displays, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output.

One or more communication units 72 of computing device 70 may communicate with devices external to computing device 70 by sending and/or receiving data, and may operate, in some respects, as both an input device and an output device. In some examples, communication units 72 may communicate with other devices over a network, e.g., network 90. Input signals to communication units 72 may include input from an input device, such as, for example, an input video feed from a video camera. As such, communication units 72 may in some cases include processing circuitry for processing the input video feed and storing corresponding video data to storage 80 for processing by video processing unit 82.

In other examples, communication units 72 may send and/or receive radio signals on a radio network such as a cellular radio network. In other examples, communication units 72 of computing device 70 may transmit and/or receive satellite signals on a satellite network such as a GPS network. Examples of communication units 72 include a network interface card (e.g. such as an Ethernet card), an optical transceiver, a radio frequency transceiver, a GPS receiver, or any other type of device that can send and/or receive information. Other examples of communication units 72 may include Bluetooth®, GPS, 3G, 4G, and Wi-Fi® radios found in mobile devices as well as Universal Serial Bus (USB) controllers and the like.

One or more processors 78 of computing device 70 may implement functionality and/or execute instructions. Examples of processors 78 include microprocessors, application processors, display controllers, auxiliary processors, one or more sensor hubs, and any other hardware configured to function as a processor, a processing unit, a processing device, or processing circuitry. Computing device 70 may use one or more processors 78 to perform operations in accordance with one or more aspects of the present disclosure using software, hardware, firmware, or a mixture of hardware, software, and firmware stored by and/or executing at computing device 70.

One or more storage devices 80 may store information for processing during operation of Computing device 70. In some examples, one or more storage devices 80 are temporary memories, meaning that a primary purpose of the one or more storage devices is not long-term storage. Storage devices 80 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 80, in some examples, also include one or more computer-readable storage media. Storage devices 80 may be configured to store larger amounts of information than volatile memory. Storage devices 80 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices 80 may store program instructions and/or data associated with one or more of the units described in accordance with one or more aspects of this disclosure.

One or more processors 78 and one or more storage devices 80 may provide an operating environment or platform for one or more units, which may be implemented as software, but may in some examples include any combination of hardware, firmware, and software. One or more processors 78 may execute instructions and one or more storage devices 80 may store instructions and/or data of one or more units. The combination of processors 78 and storage devices 80 may retrieve, store, and/or execute the instructions and/or data of one or more applications, units, or software. Processors 78 and/or storage devices 80 may also be operably coupled to one or more other software and/or hardware components, including, but not limited to, one or more of the components illustrated in FIG. 5.

One or more units illustrated in FIG. 5 as being included within storage devices 80 (or units otherwise described herein) may perform operations described using software, hardware, firmware, or a mixture of hardware, software, and firmware residing in and/or executing at computing device 70. Computing device 70 may execute each of the unit(s) with multiple processors or multiple devices. Computing device 70 may execute one or more of such units natively, or as a virtual machine or container executing on underlying hardware. One or more of such units may execute as one or more services of an operating system 88 or computing platform. One or more of such units may execute as one or more executable programs at an application layer of an operating platform provided by operating system 88.

Storage device 80 include an operating system 88 and a video processing unit 82 for performing operations related to the asset security system in accordance with the disclosure. Computing device 70 may receive an input video feed, e.g., via communication unit 72 and network 90. Computing device 70 may output the output video feed, e.g., via communication unit 72 and network 90. The input video feed includes images of one or more objects. Video processing unit 82 analyzes and/or generates an output video feed. In some examples, video processing unit 82 adds a privacy control to occlude images of one or more assets that a customer is not authorized to view while preserving images of one or more assets that the same customer is authorized to view.

In some examples, video processing unit 82 includes object identification mechanism 84. Object identification mechanism 84 may use a motion tracking algorithm, a pixel classification technique, a simultaneous localization and mapping (SLAM) technique, a marker-based identification technique, a markerless-based identification technique, a video editing technique, or any other technique to obscure images of one or more assets that the customer is not authorized to view. Object identification mechanism 84 may determine an operator as a customer seeking to receive an output video feed. Object identification mechanism 84 may communicate with an output device and/or with a customer database 94 via network 90 to determine which customer seeks to receive the output video feed. Customer database 94 may include information about one or more customers co-located within a data center, such as, for example, output devices owned by the customer, the location of the customer, credentials used by the customer or by the operator associated with the customer to access the asset security system described herein, or the like. Customer database 94 may further include information about objects in an environment including privacy controls and any assets owned by the one or more customers.

Video processing unit 82 may receive video data as input from an input device (e.g., a camera unit) and then, feed that video data, as input, into object identification mechanism 84. In some examples, object identification mechanism 84 uses session data 96, e.g., location data of an input device and the locations of objects, in object database 92 to determine the corresponding identity for an object based on images in the input video feed.

Session data 96 generally includes any information corresponding to a remote assist call between a customer and a computing device of a remote asset facility as described herein. Session data 96 may include various attributes describing objects within an environment and one or more privacy controls for augmenting one or more objects to occlude non-customer objects forming a non-customer space.

Session data 96 may include Cartesian coordinates to denote the location of an input device in a data center, a hall, room, aisle, cage, or other area within the data center viewable by the input device, an altitude and azimuth to denote the orientation of the input device, GPS data, geofencing data, or any other data relating to the location of the input device or the image of an asset in the input video feed. Object database 92 may include data pertaining to the location, name, identifying information and/or ownership of assets in a data center. The identifying information may include a bar code value, QR code value, unique string, or other identifying information that uniquely identifies an asset. In some examples, object database 92 includes additional information about the data center.

Video processing unit 82 may invoke object identification mechanism 84 to identify objects in an input video feed including objects to be used as privacy controls for visually segmenting an environment within the remote asset facility into a customer space containing customer assets for a customer space and a non-customer space. Some objects in the remote asset facility separate one customer's assets from another customer's assets. Such an object may be a physical object (e.g., a polymer mesh barrier or wall) that forms an actual boundary (or a portion thereof) for the customer space in the remote asset facility. Object identification mechanism 84 may use a machine learning model and features from object database 92 to classify a given object in the customer space according to one or more categories, including object type, whether the object is a customer asset, an unauthorized asset, at least part of surroundings (e.g., infrastructure), or a physical boundary between the customer space and the remote asset facility. Another example of such an object may be a virtual object (e.g., a polygonal graphical element) that simulates an actual boundary (or a portion thereof) for the customer space in the remote asset facility. A user may provide input indicating location data for adding the virtual boundary as a privacy control. The virtual boundary may be a previous privacy control used for a previous remote session with the customer.

According to one example object identification mechanism 84, video processing unit 82 may define an extended reality privacy control for an object such as a wall or a barrier. Then, video processing unit 82 may execute augmentation mechanism 86 to modify image data matching location data for the wall or the barrier in first video data of an input video feed and then, generate an output video feed from second video data. In one example, the second video data results from augmentation mechanism 86 adding, to the first video data, image data corresponding to the extended reality privacy control.

According to another example object identification mechanism 84, video processing unit 82 may perform an image scan of the environment being captured for patterns (e.g., polygons) and then, apply a machine learning model to detect objects forming at least a portion of a physical boundary surrounding the customer asset(s). In some examples, based on the detected surroundings, video processing unit 82 may identify the physical boundary (e.g., cabinet cage walls) to be used for the privacy control (e.g., an opaque boundary). This physical boundary may be augmented to occlude image data, in the input video feed, matching the physical boundary. In some examples, when the input video feed depicts walls 28, video processing unit 82 may define the privacy control with the corresponding image data that, when rendered, forms an opaque polygon to replace walls 28.

In other examples, video processing unit 82 may execute augmentation mechanism 86 to render image data of the extended reality privacy control and add code for performing some functionality. In these examples, video processing unit 82 may use session data 96 to modify any video data having at least one image for this physical boundary, for example, by overlaying corresponding image data for the extended reality privacy control, and then, generate, for output via an output device, a video feed of augmented video data to provide the customer. The augmented video data may be configured to enable at least some interaction with the extended reality privacy control while obscuring one or more images of assets identified in an input video feed that are not owned by a customer who is to receive the output video feed. Augmentation mechanism 86 may blur, censor, block, or otherwise obscure the identified object (e.g., asset) or a portion of the output video feed including the identified object (e.g., asset) that the customer is not authorized to view.

Video processing unit 82 may be employed for a remote assist call between customer D and the human technician. The human technician may use computing device 70 to receive the input video feed and obtain location data and other session data for the extended reality privacy control to overlay the input video feed. As an alternative to the human technician, hardware/software components may run an automated video platform for a remote asset facility. Augmentation mechanism 86 may enable tools and other functionality for customer use by way of an interface to, such as annotations. The annotations may be spatially pinned to certain extended reality privacy controls. Customer D may use the interface instantiated by augmentation mechanism 86 to invoke annotation functionality, for example, to identify a certain part or a wire or port or switch that needs to be changed.

Figure 6:
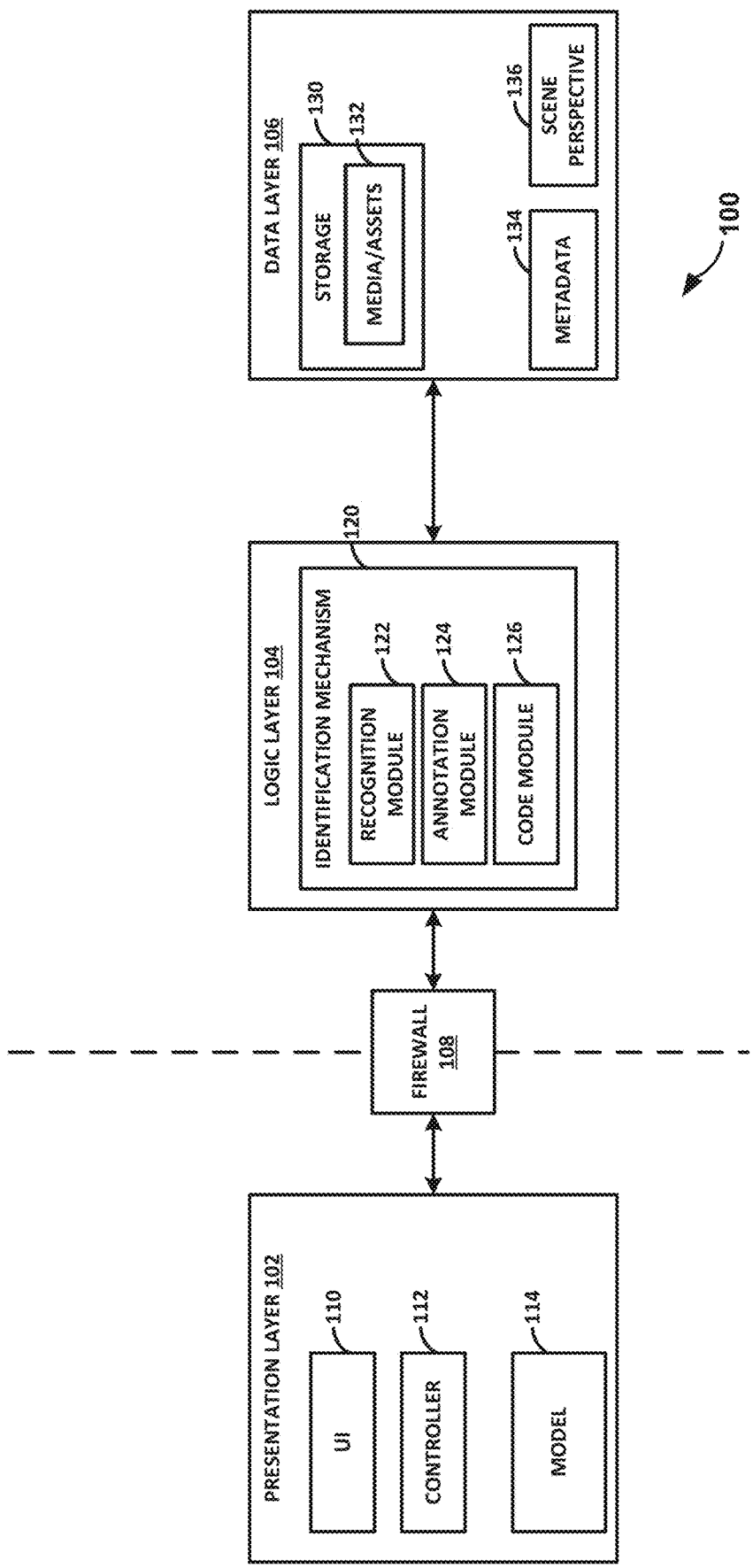
FIG. 6 is a block diagram illustrating an example architecture of the example remote video platform of FIG. 5, in accordance with the aspects of the disclosure.

FIG. 6 is a block diagram illustrating architecture 100 of an example remote video platform, in accordance with the aspects of the disclosure. In some examples, the example remote video platform may be video platform 22 as described herein for FIG. 1 or computing device 70 as described herein for FIG. 5.

In general, architecture 100 includes a number of elements (e.g., logical elements) that may be organized into multiple layers. A number of devices (e.g., of a system) may implement architecture 100. Each layer includes hardware/software components that operate in a computing device configured for receiving input (e.g., from another layer) and generating output (e.g., for another layer). As depicted in FIG. 6, one example organization for architecture 100 includes presentation layer 102, logic layer 104, and data layer 106; other examples of architecture 100 may implement a different organization that includes more or less layers.

There may be a common firewall 108 between presentation layer 102 and logic layer 104 to preserve and protect potentially sensitive internal data and functionality. Firewall 108 may be implemented in hardware, software, or a combination of hardware and software. One example purpose of firewall 108 is to demarcate respective physical devices for presentation layer 102 and logic layer 104. For example, a human user may use a computing device to connect, via a network, to a remote asset facility and engage in a remote assist call with one or more computing devices of a video platform and/or a technician in the remote asset facility. The human user may be a customer who, as part of the remote assist call, receives a video feed for presentation on a display of their computing device. The one or more computing devices of the video platform and/or the technician may capture video data of an area in the remote asset facility, identify an object for occluding any object(s) not owned by the human user/customer (i.e., non-customer space), generate session data for the remote assist call including location data for the identified object, and then, output the session data and a video feed of the captured video data (without any substantial modification). In turn, the computing device of the human user/customer may use the session data to augment an extended reality privacy control to the identified object and then, generate (for display on the display) augmented video data preserving any object(s) owned by the human user/customer (i.e., customer space). Alternatively, the one or more computing devices of the video platform and/or the technician may perform the augmentation to the captured video data to generate augmented video data and then, output a video feed of the augmented video data. With respect to content presented to the human user/customer by rendering the augmented video data, presentation layer 102 enables interaction with the content including any extended reality privacy control as described herein.

Presentation layer 102, in general, refers to hardware/software components that generate content for presentation to a human user via an electronic display. In one example, the human user may operate a mobile device and interact with user interface (UI) 110 as a graphical user interface (GUI) on which various content is presented. UI 110 may populate that content with various mechanisms that allow the human user to invoke some functionality. Controller 112 may be a hardware/software component configured to generate UI 110 such that when the human user activates a mechanism on the GUI, controller 112 may execute the functionality associated with the activated mechanism. Controller 112 may configure an application to run on a computing device (e.g., a mobile device of a customer or a technician) and present content for UI 110 on an electronic display. As explained in further detail herein for FIG. 7, examples of mechanisms that the human user may activate include an object identification mechanism and an augmentation mechanism.

In one example, presentation layer 102 may implement an architectural pattern, such as, for instance, Model-View-Controller (MVC), for UI 110, controller 112, and model 114. In general, MVC is a design that decouples a view that UI 110 presents to the human user, application logic in controller 112, and data in model 114. UI 110 may include a rendering engine for generating content from video data/image data. Examples of the rendering engine include any type of Augmented Reality (AR) engine such as Unity™ or Vuforia™. Controller 112 includes various modules (e.g., AR modules) to support the rendering engine of UI 110, for example, by providing a core attribute for facilitating a privacy control, such as a boundary, to augment a view as described herein. Model 114 be a storage component (e.g., semi-persistent data storage) for storing the core attributes of the above privacy control.

In one example, the rendering engine of UI 110 may generate a view (e.g., an augmented view) of an environment within a remote asset facility. The augmented view may result from a combination of the privacy control and an initial view of the same environment.

Presentation layer 102 implements front-facing and session dependent technology in either an input device or an output device. Regardless of the implementation, a video feed is examined by firewall 108 before that video feed is communicated from/to the input device/output device.

When configured for automatic mode of operation, the input device may communicate video data contemporaneously with its capture. As described herein, the input device (e.g., a camera device or a mobile phone with a camera unit) is configured to capture images for the video data for (e.g., contemporaneous) communication as an input video feed to a computing device for video platform 22, which may generate second video data for an output video feed to an output device (e.g., a mobile device of a customer). The video data from the input device may be automatically fed to the video platform 22 without human user involvement or with trivial human user involvement. Video platform 22, in turn, may modify the video data with privacy controls and communicate the second video data as the output video feed (e.g., near-simultaneously). In this manner, an overall latency in providing the customer an augmented view of the same environment is reduced. As described herein, video platform 22 may execute hardware/software components for logic layer 104 and generate the video data for the output video feed.

When another mode is operative on the input device, UI 110 may generate video data to first present to a human user as an initial view of an environment within the remote asset facility. The initial view may include images for both objects that the above customer is authorized to view and assets that the above customer is not authorized to view. Amongst the authorized objects may exist at least one object to be used for a privacy control including an extended reality privacy control. For the initial view, UI 110 may also render content with GUI components for accepting input from the human user. UI 110 may implement a Natural User Interface for the GUI such that the human user may provide input by way of gestures, speech, and/or the like. Instead of a computing device in video platform 22 identifying at least one object for augmenting a privacy control, the human user may identify certain objects for the augmentation and then, confirm authorization for (or ownership by) the above customer. This may be accomplished by invoking an object identification mechanism as described herein.

There are a number of object identification mechanisms and supporting modules for each mechanism to implement for presentation layer 102 and/or logic layer 104. Controller 112 may include a number of modules having various logic that when executed, perform operations in support of mechanisms for accomplishing object identification that are generated by UI 110 for presentation to the human user (e.g., a technician).

In one example mechanism, the human user may use the input device to capture a visual graphic encoding information for identifying certain objects as targets for privacy controls and, possibly, other examples of objects (e.g., assets). The visual graphic may be represented as a QR code or a bar code that is somehow affixed to an object. UI 110 may include hardware/software component(s) to implement a code scanner for the human user may operate when engaging in object identification. The human user may scan an object (or a portion thereof) to capture a code and to effectuate the object identification, and in turn, controller 112 may communicate the captured code in a service request. The service request may include a query for identity data for the object, and as a response, hardware/software components of video platform 22 may perform a database lookup operation to access matching identity data for the received code. Video platform 22 may return the matching identity data to the input device, which proceeds to present the matching identity data. Based on the matching identity data, the controller 112 may determine that the object is to be augmented with a privacy control as directed by a particular customer.

In another example mechanism, the human user may use the input device to interact (e.g., via tactile input) with images of the input video feed by entering information identifying certain objects as privacy controls and other objects that a particular customer is not authorized to view (e.g., non-customer assets). UI 110 may be configured to annotate an image in the input video feed with the information defining a boundary to enclose (e.g., a customer space comprising) objects owned by the particular customer (e.g., customer assets) and their surroundings. The input device may implement a touchscreen on an electronic display, and UI 110 may generate content to present on the touchscreen that the human user may activate to annotate an object as either a different customer's asset (e.g., non-customer space) or at least a portion of the boundary for visually segmenting an environment within the remote asset facility into the customer space comprising the customer assets and the non-customer space. Any object in the image that remains unannotated may indicate that the customer is authorized to view that object (without occlusion) in an output video feed of the same environment as the input video feed. Any object in the image that is annotated may indicate that the customer desires an extended reality privacy control to augment/ occlude that object. Alternatively, the human user may annotate that image to indicate the particular object's status as a customer object in a portion of the customer space, such as an asset, or as portion of the boundary for augmentation with the extended reality privacy control. When the human user completes their annotation of every object within the environment being recorded in the input video feed, the input device submits the annotated input video feed to video platform 22 for overlaying the extended reality privacy control to occlude non-customer assets and insert a GUI object configured to execute one or more operations in response to user input.

In an additional mechanism, the human user may leverage concepts in machine learning and image processing to generate information for an object (e.g., unknown object) located in the remote asset facility. Video platform 22 may obtain location data for the object from a storage device and/or an input device. In some instances, a technician may know that an object is a certain object type but not the customer who owns it or that an object has a specific customer but not what type of asset is it. The same technician may use one or more objects to construct a barrier between the customer space and a non-customer space of the same environment but may not be able to provide input data indicating that there is a physical boundary surrounding customer assets. By building a model for specific objects using various recognition algorithms (e.g., clustering and Bayesian classification), video platform 22 may confirm that an image of the object illustrates part of the barrier segmenting the customer asset from non-customer space. In addition to object identification, video platform 22 may evaluate an image of an environment within the facility and identify additional location data (e.g., a relative depth map/chart) for the objects in the same environment.

As mentioned above, an output device coupled to video platform 22 may implement presentation layer 102 for an output video feed. The output device may receive the output video feed and render one or more video frames for presentation on an electronic display. When presented to an operator for a customer, the output video feed provides an augmented view of an environment within the remote asset facility where a boundary segments the environment into a non-customer space enclosing non-customer objects and a customer space enclosing customer assets. Logic layer 104, which described in further detail below, may be configured to define such a boundary and enable a projection of corresponding image data onto location data for the boundary and/or the non-customer space. For a given video frame, image data for a privacy control may occlude (e.g., replaces) image data corresponding to the non-customer space while preserving image data of the customer space. To the benefit of video platform 22, the privacy control closes a potential data leak for and secures the sensitive information of a second (different) customer. By presenting the augmented view on the output device, the second customer also benefits from the protection against misappropriation provided to their assets, which are housed in a facility under the control of a third-party. Hence, video platform 22 may send multiple customers a shared video feed of the same facility without substantial risk to any one or more customers.

Regardless of whether one or both of the input device and the output device implement presentation layer 102, logic layer 104 receives, as input, first video data for an initial view of an environment within the remote asset facility and generates, as output, second video data for an augmented view of the same environment. Hardware/software components of logic layer 104 are configured to modify the input video data on frame-by-frame or image-by-image basis by including a privacy control to occlude assets that the customer is not authorized to view. To modify an image having at least a portion of a non-customer space comprising non-customer objects, one or more components of logic layer 104 may overlay image data of a privacy control onto that portion, preventing the non-customer objects from visualization according to one example. The overlayed image data may correspond to a boundary of the customer space comprising customer assets. In one example, the boundary may be defined based on an actual physical structure (e.g., walls) within the environment. In one example, the boundary may be defined based on location data for customer assets of the customer space.

In some examples, FIG. 6 depicts logic layer 104 as a logical representation of the above platform as well as an Application Programming Interface (API) for invoking functionality and running application on that platform. Logic layer 104 may include hardware/software components to implement a number of compatible technologies for pattern recognition in any context. In one example, logic layer 104 may be configured as a platform through which other hardware/software components perform techniques in accordance with machine vision, artificial intelligence/machine learning, and/or other compatible technologies. The platform may implement components (e.g., pattern recognition components) that are configured to perform pattern recognition techniques. These components can be extended with various modules, as described herein, on top of which other (e.g., more complex) components may be built. Additional software programs (e.g., Pattern Recognition Tools) enable various types of options to assist in recognizing certain patterns.

In some examples, FIG. 6 depicts logic layer 104 as a logical representation of a machine learning algorithm (e.g., a machine learning model (MLM)) and includes a number of example hardware/software components. As an example, components of logic layer 104 may build an example MLM that is configured to classify an object within the above-mentioned environment as an asset (e.g., of a certain type and owned by a specific customer) or part of a privacy control (e.g., a physical or virtual boundary surrounding customer space). The example MLM may be further configured to predict (within a certain degree of accuracy) location data for each identified object including any privacy control. The example MLM may be based on one or more features corresponding to potential patterns and schemas.

One or more example hardware/software components may be configured for object recognition and machine learning and, in some instances, comprised of modules to effectuate supervised learning or unsupervised learning for an example MLM. Some modules may be configured with software code that when executed by processing circuitry, perform machine learning algorithms for MLM training, evaluation, and testing on one or more training sets. These modules may build a classifier (e.g., a Bayesian Classifier) as an example of a trained and test model developed for recognizing patterns in image data for a single image or a plurality of images (e.g., video frames of a video feed).

Another set of example modules may be configured with software code implementing respective machine learning algorithms for unsupervised learning. In contrast to the supervised algorithms for pattern recognition that make use of training and testing sets, these algorithms use a group by approach. An applicable machine learning algorithm may define patterns in a plurality of images (e.g., video data) and group them based on the similarity in their features such as dimension to make a prediction. Some of these example modules build a clustering model that combines or groups images having same or similar features and implement a similarity metric when comparing two or more images; for example, if two images satisfy a threshold percentage of the similarity metric, both images most likely illustrate a particular object. After building a model to define a representative image pattern that is configured to identify the particular object in a single image or a number of images (e.g., video frames).

Consider an example remote asset facility where multiple structures of at least two different object types may be adjacent to each other and input devices often capture these structures in a same image, an example module may perform a clustering technique to group together the multiple structures according to asset features. If an unknown structure is encountered, the clustering technique regroups the multiple structure with the unknown structure and identifies the unknown structure by its group (e.g., cluster). In general, the clustering technique is directed to grouping objects found in the remote asset facility into clusters such that objects within a cluster are as similar as possible, whereas objects from different clusters are as dissimilar as possible. Hierarchical and k-means clustering are some examples of the above clustering technique. Another module for use in unsupervised learning may determine an accurate combination of asset features for the clustering technique. In this example, no previous knowledge is required for identifying a new asset.

One example module for the pattern recognition component may train a machine learning model (MLM) to receive, as input, an image and generate, as output, an accurate prediction as to identity data for an object depicted in the image. The input image may depict a view (e.g., a partial view) into an environment. As demonstrated herein for some examples, the input image for the MLM may be representative of a single object from a perspective of a human user of the input device or multiple objects in a same environment. The environment of the input image may refer to a pre-defined volume/area within the remote asset facility.

Another example hardware/software component may be comprised of modules, each of which may be directed to perform one or more image processing algorithms. An image processing model in general relates to digital or analog image processing in one or more techniques based on the situation, scene, or environment being recorded and transmitted in a video feed. Some example modules may evaluate images/frames of a video feed in order to present an augmented view of the environment being recorded in the video feed. Some of these modules provide support for the above-mentioned pattern recognition techniques, for example, by performing certain image processing techniques on images (e.g., video frames) of an input video feed. Machine learning algorithms perform operations on a model and often avail the above image processing modules, for example, to apply the above pattern recognition techniques. There are a number of additional examples in which pattern recognition techniques may be adapted for specific uses in image processing.

Data layer 106 may include a number of hardware/software components to support components of logic layer 104 and/or presentation layer 102. Data layer 106 may provide, as one type of component, data storage resources (e.g., Microsoft® BLOB™ storage in which containers group together data of one service client) for storing media files includes images of objects and information identifying certain objects as assets. Data layer 106 may have some data resources allocated to a network resource (e.g., a cloud computing service provider). The network resource may run a programming platform from which applications may be developed, run, and/or used by video platform 22 to access, from anywhere in the world, media files that may include audio, video, and text.

One example storage resource may be a database system to organize the media files into distinct identifiable objects of which each identifiable object maps to matching identity data. In general, the media files of data layer 102 store image data to represent a variety of physical objects of which some may be located within the remote asset facility. Accordingly, some media files represent assets that are located within the remote asset facility. Based on a determination that a customer is authorized to view an asset, video platform 22 may generate video data to include a representative image for that authorized customer asset; however, video platform 22 may generate video data to occlude the representative image with a privacy control in response to a determination that the customer is not authorized to view that asset.

In some examples, data layer 106 may store images of assets that may be utilized in logic layer 104 for training and/or testing (i.e., training sets and/or testing sets). Some of these sets of images may be recent iterations of the testing set and training set, respectively. There are also images of privacy controls to occlude unauthorized assets, for example, by way of a projection of privacy control image data onto a space or area including the unauthorized assets. For each privacy control type, data layer 106 defines a shape, an intensity (e.g., color), a depth (e.g., a depth level), and any other image parameter for one or more image pixels or voxels.

A privacy wall, as described herein, may operate as an example privacy control and after an example MLM of logic layer 104 identifies an object in an image as a non-customer object, an example image processing component of logic layer 104 may modify the image to include various definable privacy walls based on shape data, image data, and (possibly) other data for each wall type. In one example, the example image processing component of logic layer 104 may modify the image to overlay background image data with different image data, for example, by setting a depth level parameter for the image to the location data for the extended reality privacy control and augmenting at least a portion of the background image data with image data of the privacy wall.

Data layer 106 may also store metadata in media files of a library of images (e.g., two-dimensional image data) for a number of identifiable three-dimensional assets in the remote asset facility as described herein. Example metadata may provide details describing a media file and its content including information required for helping set up and render a core layout of an image (e.g., of a video frame). As described herein, video platform 22 may receive an input video feed having video data captured by an input device when recording an asset facility and then, transform the input video feed into an output video feed for an output device by combining the video data with data from a media file of a privacy control. To generate the output video feed, logic layer 104 may use the data (e.g., image data, metadata, etc.) in the media file to render content for the privacy control occluding unauthorized assets. Logic layer 104 may store data (e.g., image data) for the rendered content in second video data. The output device may, in combination with example image data of the output video feed, use example the same metadata when rendering the content of the second video data on a computing device of the customer.

Data layer 106 may store additional information for images data or videos of the asset library. As an example, data layer 106 may store information corresponding to an environment within the remote asset facility, including information (i.e., scene persistence information) to persist that environment as a scene in the output video feed to the customer. The scene persistence information may store information corresponding to a background in first video data for the input video feed and/or second video data for the output video feed and the media files may store images for foreground objects, which may include assets that the customer may view.

In a remote assistance session between the customer and privacy virtualization system 22, input device may capture images of an environment including non-customer assets and customer assets. Privacy virtualization system 22 may determine information to define a scene from a perspective of the input device or a human user where at least a portion of the environment forms at least a portion of a background. For any given scene where at least one of the non-customer assets form the background, privacy virtualization system 22 may establish the customer assets as foreground objects. In one example, logic layer 104 may generate the output video feed where the environment is not occluded by rendering, for the second video data, background content of output video feed using the scene persistence information.

The example architecture of FIG. 6 may include additional layers and alternative components for presentation layer 102, logic layer 104, and data layer 104 to improve upon the performance of video platform 22. A component of another layer may access, from a component of logic layer 104, a current iteration of a clustering model or a classifier model to predict identity data of an object in a view from a point of view of a camera unit. The component may be configured to reject the clustering model or the classifier model or confirm that the clustering model or the classifier model is accurate and consistent with respect to recognizing mesh walls upon which privacy walls are to be overlayed.

In one example, a pattern recognition component of logic layer 104 may generate an object identification mechanism in accordance with the present disclosure and for that mechanism, build a trained and tested model that is configured with data for recognizing (e.g., image data of) an object that is located in a remote asset facility. The object identification mechanism is configured to accurately identify the object as a privacy control. The object identification mechanism may further identify portions of storage resources having data that corresponds to the above asset. Examples of such data include image data (e.g., images) or video data (e.g., video frames) at least one pixel or voxel includes intensity data for the non-customer asset.

As an option, the pattern recognition component of logic layer 104 may apply the object identification mechanism to compute other examples of identity data for any given asset (e.g., the above non-customer asset) including depth information (e.g., parameters), relative distances to other assets, and other forms of location data (e.g., two-dimensional (2D)/three-dimensional (3D) coordinates) for a non-customer space of data points (e.g., forming an area, a volume, or a polygon geometry).

The object identification mechanism may further identify objects that are a part of the remote asset facility. Some objects may have vulnerabilities or leaks and for at least that reason, constitute as potential privacy risks. As an example, a meshed wall that is installed between assets but from certain perspectives, permit a view into the non-customer asset. In some examples, the object identification mechanism may identify image data for meshed walls and further identify associated privacy controls for the pattern recognition component to overlay (e.g., as privacy walls) on video data of a video feed from the remote asset facility.

Figure 7:
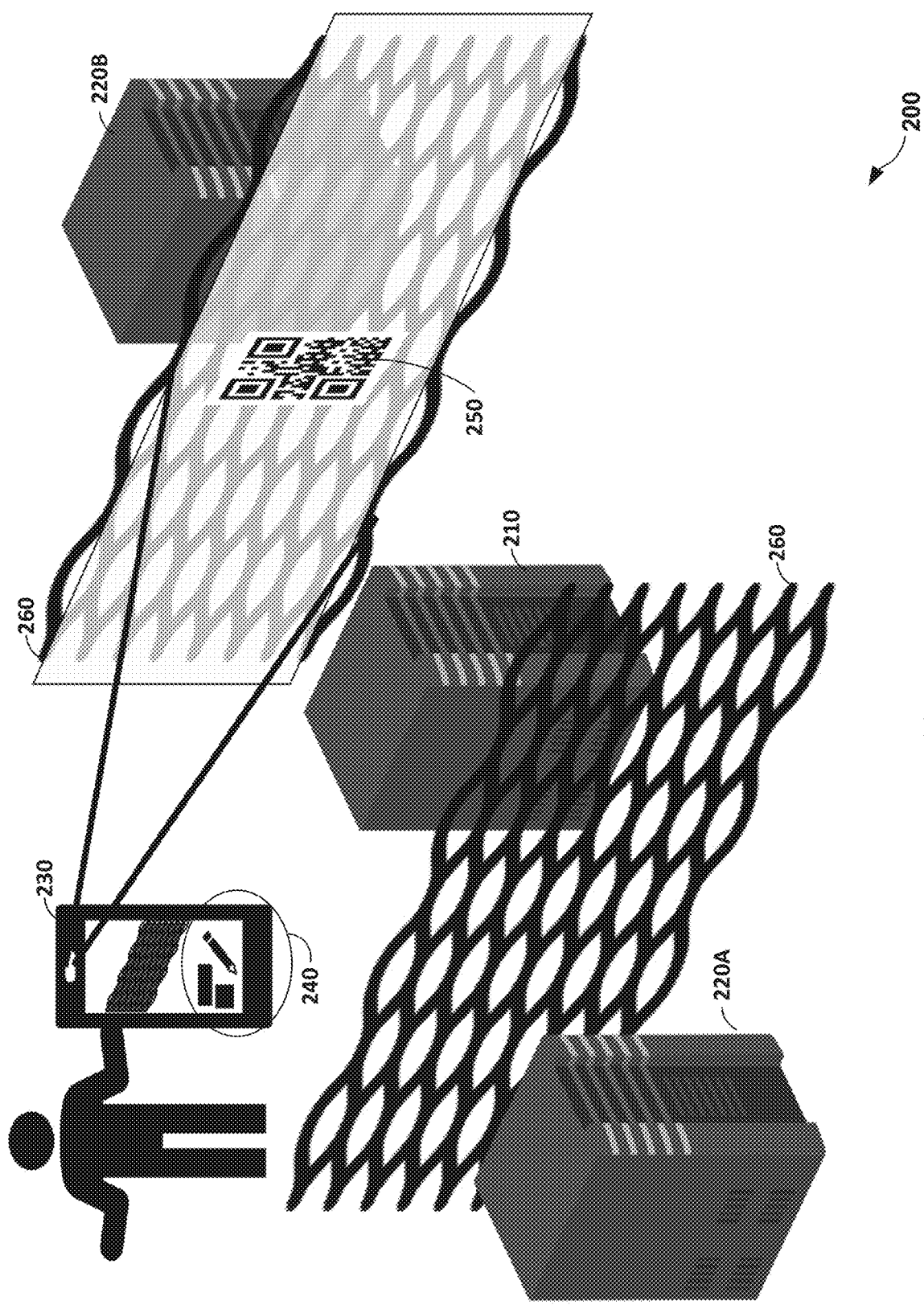
FIG. 7 is an illustration of an example environment with a remote asset facility, in accordance with the aspects of the disclosure.

As explained in further detail in the description for FIG. 7, a technician of the remote asset facility may capture video data of a customer asset and for the protection of other customers and the privacy they expect/desire of their assets, privacy control image data may overlay image data of non-customer assets to occlude them from view by the customer. This may be accomplished by creating by a boundary between a space (e.g., a three-dimensional space) for the customer and their assets and another space for other objects within the remote asset facility. Video platform 22 of the present disclosure may present to the customer an augmented view of objects in the environment in which they are presently located occlude. To generate the augmented view, video platform 22 provides the customer with a video feed to their device. The video feed may include second video data that is generated from image data for the customer assets and the image data of a privacy control overlaying image data of the non-customer asset.

As described herein, a technician of the remote asset facility may capture video data of an object and invoke functionality of the Application Programming Interface (API) provided by video platform 22. Example of such functionality may be a compatible object identification mechanism to identify the object for augmentation. Another example of such functionality is an augmentation mechanism to occlude the non-customer asset from view of the customer. The augmentation mechanism may access video data having the identified objects, modify image data of the video data to overlay image data for a privacy control, define a boundary between the customer object(s) and any object that the customer is not authorized to view, and then, generate augmented video data based on second video data. Video platform 22 may receive the video data in an input video feed from an input device and communicate the augmented video data in an output video feed to an output device. By providing the customer with the output video feed in which the privacy control occludes image data of the non-customer asset, video platform 22 provides protection for any sensitive data that is viewable from the initial input video feed.

In another example object identification mechanism, a visual graphic may be affixed to an object in the remote asset facility and that visual graphic may encode information identifying the object as a customer asset. An image of that visual graphic may be used in a lookup operation to retrieve corresponding identity data. The visual graphic may encode a unique key for the lookup operation or, as an alternative, the identity data itself. The visual graphic may be in the form of a QR code or a bar code for which the input device may include a scanner to capture the visual graphic image.

In one example, logic layer 104 implements functionality for reading data from and/or writing data to video platform 22 and in some instances, exposes that functionality via an API. In one example, a technician of the remote asset facility may enter information for an object in that facility. The object may be an asset for a customer but lack any identity data to reference. The technician may submit appropriate identity data (e.g., an annotation) to associate with the identified asset and in response, an object identification mechanism running in video platform 22 may store the submitted identity data in (e.g., metadata of) media files having images/video frames for the identified asset.

A number of modules may support the API with additional functionality for annotating objects with information. For instance, the technician may submit captured images for any asset in the facility. The technician may use similar functionality to submit image data for a privacy control to occlude an asset that a customer is not authorized to view.

Another supporting module may enable augmentation of content rendered for an input video feed with content desired by the technician. An example augmentation module may modify video data of the input video feed to overlay image data of a privacy control. The example augmentation module may accept, from an input device of the technician, input specifying location data for an area or volume to overlay with the privacy control image data. Alternatively, the example augmentation module may determine suitable location data for the privacy control image data. The example augmentation module may overwrite an image of another object with an image of a privacy control while preserving an image of a customer asset that is in a same scene as the privacy control image.

Image thresholding may be another supporting module for the image API of logic layer 104. An example image thresholding module may enable the technician to submit input setting parameters for use in image processing component or pattern recognition component of logic layer 104. One example of a parameter to set determines whether an image of an asset is representative of that image or if a more accurate reference image may be used as a replacement.

Another supporting module (e.g., a perspective module) for the image API of logic layer 104 may execute an algorithm for computing a perspective from image data. The perspective, as described herein, refers to a position at which human eyes or a camera unit view an object and is used for capturing an image as a (e.g., two dimensional) scene representative of an environment within which the object is located. The three-dimensional environment surrounds the object in the remote asset facility and is transferred into the two-dimensional representative image. After capturing a number of images over a period of time, an input device generates video data for the same environment within the remote asset facility.

In addition to or as an alternative to the privacy control image being overlayed onto an image for a non-customer asset to occlude that asset in an augmented view of the above environment, logic layer 104 may be configured to modify the video data and generate second video data in a new perspective. The above perspective module may compute a new perspective as an update for a current perspective of the video data, particularly when non-customer assets would no longer be visible. For example, the above perspective module may modify one or more images in video data to effectuate a scene translation in a lateral direction and by doing so, the one or more modified images occlude at least one non-customer asset from view by a customer. The perspective module may enable different types of movements to change the scene for an augmented view into the remote asset facility.

The presentation layer 102 may include an additional application that is configured to allow changes to a current perspective of a video feed; a technician or a customer may use presentation layer 102 to dynamically view an environment (e.g., an environment comprised of customer space and non-customer space) being recording in the video feed. For example, presentation layer 102 may enable the generation of images for capturing various views of the same object (e.g., from different angles), possibly expanding upon the environment being recording for an updated video feed.

Another supporting module may be a detection module for markers. In some examples, markers include adaptable pieces for overlaying or rendering additional image data.

Another supporting module (e.g., a load module) may be designed for loading information to store in data layer 106, for example, in media files for objects including assets, privacy controls, and other types. The supporting load module of logic layer 104 may receive XML data to load into appropriate data fields of a file (e.g., for metadata, content, and/or record data). In one example, the load module may use a structure defined in the XML data to generate images of objects that are neither owned by any customer nor assets.

By employing the above loading module in logic layer 104, an application running in presentation layer 102 may operate an interface through which a technician or a customer may submit current metadata to store (by way of encoding) in an image of an object or with identity data of an object. The metadata may be arranged in a suitable format or configuration such that user-submitted information may be added as attributes in the media file or a database record for the asset. The object identification mechanism may use the load module to annotate an image of an unknown object.

FIG. 7 is an illustration of an example environment 200 within a remote asset facility having video platform 22 of FIG. 1, in accordance with the aspects of the disclosure. Example environment 200 may include at least one asset 210 that a particular customer owns (e.g., a customer asset) and is authorized to view via a video feed and a number of non-customer objects including at least one asset 220A and at least one asset 220B that the same customer is not authorized to view; a different customer may own at least one asset 220A and therefore, desire privacy of any viewable information on that asset and protection of their own asset from misappropriation.

An input device may generate first video data having images of at least one asset 210 as well as one or more assets of the different customer, such as at least one asset 220A and/or at least one asset 220B. Video platform 22 may be configured to receive the first video data and modify one or more images to occlude at least a portion of at least one asset 220A and/or at least one asset 220B, for example, by overlaying an image for a privacy control on each modified image. In one example, video platform 22 may generate second video data for an output video feed from the first video data and the one or more modified images. A network coupled to video platform 22 may communicate the second video data for the output video feed to an output device of a customer who may view the customer asset 210 and the privacy control occluding one or both of the non-customer assets 220A and 220B.

A technician may use their mobile device as the above input device for generating an input video feed of example environment 200. The mobile device of the technician may be configured with hardware/software components of presentation layer 102 and (possibly) logic layer 104. Based on the technician's settings, the mobile device may operate according to one or more of a number of example techniques for object identification. In particular, the technician may capture at least one image of an object within the example environment and invoke an example object identification mechanism as described herein.

FIG. 7 illustrates at least three example implementations of the above object identification mechanism. According to a first example implementation, the mobile device of the technician may be configured with functionality for machine learning model 230 (and one or more modules of logic layer 104). Functionality for machine learning model 230 may be codified in logic (e.g., logic circuitry or processor-executable instructions). Processing circuitry in the mobile device may execute that logic for images of the input video feed and generate identity data that maps to each identifiable asset in those images.

The technician may invoke functionality to apply machine learning model 230 to image data when a camera unit captures one or more images having an effective portion of an object to identify. The technician may require information regarding the object, for example, to inform the customer and answer their queries. Once the object in an image is identified as an authorized asset for the customer, the logic for machine learning model 230 may be configured to determine suitable asset identity data. Machine learning model 230 and/or a network resource for video platform 22 store information regarding the identified asset. To retrieve this information from the input device and/or the network resource, the logic for machine learning model 230 may perform a search with parameters that map to the desired information. Some examples of search parameters include information stored for images having a highest similarity with the captured image with respect to the queried asset.

There are a number of algorithms to evaluate a given image for its depiction of a known object. One example metric for image evaluation may compute a value indicative of a similarity between the given image and a reference image. The logic for machine learning model 230 may instrument the example metric into a module for classifying/clustering objects as asset for the customer or assets of a different customer. The logic may evaluate captured images in streamed video data.

In addition to a customer asset, an unknown object in an image may of a number of other types. In one example, the unknown object may be a boundary in some form, such as mesh wall 260 of FIG. 7 or another structure resembling a boundary, such as a movable/removable partition. Other examples of possible boundaries may be defined for infrastructure within the remote asset facility.

The logic for machine learning model 230 may implement functionality for image processing (e.g., techniques for image recognition and/or object recognition); in one example, an application running in presentation layer 102 may invoke functionality to identify may submit image data of an unknown object and the logic may determine determination location data in addition to identity data for the object.

According to a second example implementation of the object identification mechanism, the mobile device of the technician may be configured to invoke functionality corresponding to adding data to a knowledge base for video platform 22. The technician may supply important metadata and identifiers as annotations to an image of an asset, for example, by invoking appropriate functionality of video platform 22 in accordance with example architecture 100 of FIG. 6.

According to a third example implementation of the object identification mechanism, the technician may observe an unknown asset in their environment and use an application running on a mobile device to submit image data of visual graphic 250. Although FIG. 7 depicts visual graphic 250 as affixed to mesh wall 260, the unknown object may be asset 210 and various information may be encoded by visual graphic 250. The mobile device may include a scanner unit operative to scan visual graphic 250 (e.g., as a bar code or QR code) and submit the scanned image data to a module for the image API of logic layer 104.

The techniques described herein may be implemented in hardware, software, firmware, or any combination thereof. Various features described as modules, units, or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may include a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may include one or more computer-readable storage media. In some examples, the computer-readable storage media includes non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
 receiving, by a first computing device, a video feed for an environment within a remote asset facility;
 receiving, by the first computing device, user input to annotate an object in the video feed as at least a portion of a boundary;
 receiving, by a second computing device, an indication of the annotated object obtaining, by a second computing device, based on the indication of the annotated object, session data for a video feed, the session data comprising location data for an extended reality privacy control to occlude the annotated object to visually segment the environment within the remote asset facility into a customer space comprising customer assets for a customer and a non-customer space;
 receiving, by the second computing device, first video data representing the environment within the remote asset facility;
 augmenting, by the second computing device and based on the location data for the extended reality privacy control, the first video data by overlaying the extended reality privacy control at a location within the video feed that is based on the annotated object to generate second video data having at least a portion of the non-customer space occluded with the extended reality privacy control; and
 outputting, by the second computing device, the second video data for display at a display device.

2. The method of claim 1, wherein obtaining, by the second computing device, the session data further comprises identifying, as the extended reality privacy control, the annotated object within the environment based on an application of an object identification mechanism to the first video data.

3. The method of claim 1, wherein obtaining, by the second computing device, the session data further comprises identifying, as the extended reality privacy control, one or more of a number of objects within the environment based on an application of a machine learning model to at least one of sample image data of the first video data or input feature data generated from sample image data of the first video data.

4. The method of claim 1, wherein obtaining, by the second computing device, the session data further comprises determining the session data for the extended reality privacy control in response to the second computing device receiving an indication of an interaction by the user with the extended reality privacy control, wherein the interaction comprises the user input received via a user interface of the first computing device.

5. The method of claim 1, wherein the user input is first user input, and wherein obtaining, by the second computing device, the session data further comprises determining identity data for the annotated object in response to a second user input indicative of a portion of the identity data.

6. The method of claim 1, wherein obtaining, by the first computing device, the session data further comprises determining identity data for the annotated object associated with an encoded visual graphic coupled to the annotated object.

7. The method of claim 1, wherein obtaining, by the second computing device, the session data further comprises determining identity data for the annotated object based on a visual graphic encoding identity data for the annotated object.

8. The method of claim 1, wherein the first computing device is operated by a technician of the remote asset facility.

9. A computing device for a video platform of a remote asset facility, comprising:
 a memory; and
 communication circuitry coupled to an input device and configured to provide a video feed of an environment, wherein the input device generates the video feed for a customer;
 processing circuitry, executing logic stored in the memory, configured to:
  receive an indication of an annotated object that has been annotated by a user in the video feed for an environment within a remote asset facility;
  obtain, based on the indication of the annotated object, session data for a video feed, the session data comprising location data for an extended reality privacy control to occlude the annotated object to visually segment the environment within the remote asset facility into a customer space comprising customer assets for a customer and a non-customer space;

receive first video data representing the environment within the remote asset facility;

augment, based on the location data for the extended reality privacy control, the first video data by overlaying the extended reality privacy control at a location within the video feed that is based on the annotated object to generate second video data having at least a portion of the non-customer space occluded with the extended reality privacy control; and output the second video data for display at a display device coupled to the computing device.

10. The computing device of claim 9, wherein the input device comprises a camera unit communicatively coupled to the display device.

11. The computing device of claim 9, wherein to augment the first video data, the processing circuitry is configured to project a texture map onto image data of the first video data at a location based on the location data for the extended reality privacy control.

12. The computing device of claim 9, wherein to augment the first video data, the processing circuitry is configured to overlay background image data of the first video data with different image data by setting a depth level parameter for the first video data based on the location data for the extended reality privacy control.

13. The computing device of claim 9, wherein to generate the second video data, the processing circuitry is configured to, for one or more images of the first video data, set as a foreground the customer assets and replace a background with the extended reality privacy control.

14. The computing device of claim 9, wherein the processing circuitry is configured to identify the annotated object based on an application of a recognition technique to the first video data.

15. The computing device of claim 9, wherein to obtain the session data, the processing circuitry is configured to identify the annotated object within the environment based on an application of a machine learning model to at least one of sample image data of the first video data and input feature data generated from sample image data of the first video data.

16. The computing device of claim 9, wherein to obtain the session data, the processing circuitry is configured to determine identity data for the annotated object in response to an interaction by the user with the video feed, wherein the interaction comprises user input received via a natural user interface.

17. The computing device of claim 9, wherein to obtain the session data, the processing circuitry is configured to determine identity data for the annotated object based on user input indicative of a portion of the identity data or based on an encoded visual graphic coupled to the annotated object.

18. A system comprising:
an input device;
an output device; and
a computing device comprising processing circuitry configured to:
receive, from the input device, an indication of an annotated object that has been annotated by a user in a video feed for an environment within a remote asset facility;

obtain, based on the indication of the annotated object, session data for a video feed, the session data comprising location data for an extended reality privacy control to occlude the annotated object to visually segment the environment within the remote asset facility into a customer space comprising customer assets for a customer and a non-customer space;

receive, from the input device, first video data representing the environment within the remote asset facility;

augment, based on the location data for the extended reality privacy control, the first video data by overlaying the extended reality privacy control at a location within the video feed that is based on the annotated object to generate second video data having at least a portion of the non-customer space occluded with the extended reality privacy control; and output, to the output device, the second video data for an augmented video feed to a computing device of the customer.

19. The system of claim 18 further comprising:
a first mobile device comprising a camera unit for capturing the first video data;
a second mobile device comprising a computer display for displaying the second video data; and
communication circuitry configured to output the second video data for display on the computer display.

20. The system of claim 18, wherein the input device is configured to capture data indicative of a visual graphic coupled to the annotated object, wherein the visual graphic is configured to encode identity data for the customer assets, wherein the output device is configured to display a visual graphic of the identity data.

* * * * *